United States Patent [19]

Hood, Jr. et al.

[11] Patent Number: 5,092,422

[45] Date of Patent: Mar. 3, 1992

[54] MULTIPURPOSE AGRICULTURAL TRACTOR

[75] Inventors: Clarence E. Hood, Jr.; Robert E. Williamson, both of Clemson, S.C.; Yekutiel Alper, Bagan, Israel

[73] Assignee: Clemson University, Clemson, S.C.

[21] Appl. No.: 449,731

[22] Filed: Dec. 12, 1989

[51] Int. Cl.$^5$ .......................... B60K 26/00; B62D 1/02
[52] U.S. Cl. ..................... 180/329; 180/331; 172/306; 172/307
[58] Field of Search ............... 172/297, 298, 306, 307, 172/292; 180/242, 209, 235, 326, 329, 330, 331

[56] References Cited

U.S. PATENT DOCUMENTS

| | | | |
|---|---|---|---|
| 2,504,403 | 4/1980 | Finley | 180/26 |
| 2,513,942 | 7/1950 | Johnson et al. | 56/21 |
| 2,888,088 | 5/1959 | Claas et al. | 180/55 |
| 3,324,635 | 6/1967 | Ashton et al. | 56/2 |
| 3,324,637 | 6/1967 | Ashton et al. | 56/21 |
| 3,425,194 | 2/1969 | Stott et al. | 56/15 |
| 3,570,614 | 3/1971 | Isacco del Bagno | 180/1 |
| 3,664,431 | 3/1972 | Tatianko et al. | 171/58 |
| 3,721,077 | 3/1973 | Cornells van der Lely | 56/15.6 |
| 3,841,429 | 10/1974 | Falcone et al. | 180/77 S |
| 4,186,811 | 2/1980 | Bidon | 180/6.48 |
| 4,576,394 | 3/1986 | van der Lely | 280/490 A |
| 4,585,084 | 4/1986 | van der Lely | 180/53.1 |
| 4,632,200 | 12/1986 | Doyen et al. | 180/53.7 |
| 4,648,472 | 3/1987 | van der Lely | 180/24 |
| 4,693,331 | 9/1987 | Johnson et al. | 172/292 |

OTHER PUBLICATIONS

Brochure entitled Generation III Tobacco Combines by Powell Manufacturing Company, Inc., in Bennettsville, S.C.

Brochure entitled 4410 Hi-Trac High Clearance Sprayer by Powell Manufacturing Company, Inc., in Bennettsville, S.C.

Brochure entitled 4400 Hi-Trac High-Clearance Tobacco Machine by Powell Manufacturing Company, Inc., in Bennettsville, S.C.

Brochure entitled Versatile 276 Bidirectional Tractor by Ford New Holland, in New Holland, Pa.

*Primary Examiner*—Kenneth R. Rice
*Attorney, Agent, or Firm*—Dority & Manning

[57] ABSTRACT

A multipurpose horticultural crop tractor combines certain clearance and versatile implement mounting features for accommodating a wide variety of alternative field production operations. A movable operator station provides full bidirectional operator control. An operator station may also be suspended on a boom pivotably mounted to the tractor frame for repositioning of the operator station about such frame. The implement mounting system also permits alternate high or low clearance mounting of a conventional three-point hitch, which when used in an elevated position enables attachment of high crop harvesting heads. Alternative implement mounts permit simultaneous usage of two separate implements. The tractor may be outfitted for many alternative functions, such as tillagae, planting, cultivating, spraying, harvesting, materials handling, and irrigating missions, including usage of a vertically movable lift unit with horizontally adjustable lift arms.

62 Claims, 11 Drawing Sheets

MULTIPURPOSE AGRICULTURAL TRACTOR

BACKGROUND OF THE INVENTION

The present invention generally concerns agricultural tractors and more particularly pertains to improved multi-purpose horticultural crop tractors. Furthermore, various present features separately pertain to improved hitching systems, movable operator stations, rear loader materials handling systems, and uses of a multipurpose tractor reversibly outfitted with implements adapted for irrigation or the like.

Present schemes and methodologies of production for a wide variety of vegetables typically make use of conventional farm tractors and various farming implements therefor, such as in conjunction with performance of hand-harvesting methods or operation of harvest-aids or fully mechanical harvesters. Basic conventional agricultural tractors have generally remained little changed since their initial introduction about the turn of this century. Even with the introduction of certain modern improvements, e.g., the three-point hitch, modern hydraulic systems, and advanced operator cabs with protection from roll-over, noise, and chemicals, conventional farm tractors have numerous limitations that prevent or reduce the chances for optimization of field operations. Many desirable features are typically lacking.

For example, there is often a lack of sufficient clearance to permit conduct of critical field operations (up to and including harvesting) for tall growing crops, such as sweet corn, staked tomatoes, peppers, and okra. Furthermore, conventional tractors typically lack the combined clearance and implement mounting features which would be desirable for intensive horticultural crops, such as vegetables, small tree crops, berries, and ornamentals.

Still another area of deficiency which has not been heretofore significantly addressed is the position and/or orientation of an operator's station, i.e., where the driver sits on the tractor and how he or she faces relative movement of the tractor and ongoing operations. Though implements have been introduced which ostensibly permit precision planting and cultivation, little in connection with the operator position has changed relative to monitoring and controlling such important operations. In short, the position of the operator station for typical present-day tractors severely limits operator visibility of various critical operations, such as precision planting, transplanting, cultivating, and mechanical harvesting. The typical fixed or nonmovable condition of most operator stations is also a drawback or limitation to maximum flexibility of prior so-called multipurpose tractors.

Yet another entirely separate area of consideration relates to the random traffic patterns of conventional tractors and field operations, particularly as relating to multicrop schemes. Some research studies have shown that such random traffic patterns can cause severe soil compaction in certain types of soils, resulting in reduced yields and increased energy requirements for deep tillage in order to overcome the machine induced compaction. Many conventional tractor designs are not adequately versatile and adaptable for accomplishing multiple purposes so as to timely allow for relatively time-important operations such as spraying and harvesting/field packing under wet soil conditions.

As counterpoint to random traffic patterns, controlled traffic production methods are being introduced which permanently designate crop-growing zones and traffic lanes for field crops. Compaction is therefore regulated to assure minimum compaction in the crop root zone, limited compaction in the seedling emergence area, and maximum compaction in the traffic lanes. While controlled traffic production methods offer the potential for eliminating heavy tillage needs in the crop production zone while simultaneously increasing compaction in traffic lanes over the years to improve tractor efficiency, flotation, and timeliness of critical operations, a typical conventional farm tractor by itself (though combined with various implements) is generally not versatile enough to efficiently support such controlled traffic production methodology.

Some vehicles exist today which exhibit high clearance characteristics as well as a three meter wheel width (twice the width of typical 1.5 meter-spaced crop rows so as to simultaneously span two rows). One example of such is the "GENERATION III" line of tobacco combines made by Powell Manufacturing Company, Inc., of Bennettsville, S.C. 29512. Another example of a high clearance machine is the 4400 "Hi-Trac" tobacco machine of Powell Manufacturing, while yet another example is the 4410 "Hi-Trac" high clearance sprayer of Powell Manufacturing Company.

Ford New Holland, Inc., of New Holland, Pa., markets a so-called bidirectional tractor referred to as the "VERSATILE 276."The tractor has a turning assembly, by which the seat, steering wheel, and console gauges all revolve 180 degrees as a unit, all contained within an operator station or cab. Throttle and other controls do not move with the seat and steering wheel, but are fixed within the operator station or cab, which results in the position of the throttle "changing sides" relative the operator as the operator reverses. In other words, the operator must relearn the control positions each time the seat and steering wheel are moved anywhere within the permitted 180 degrees of revolution. U.S. Pat. No. 3,721,077, by van der Lely, discloses a tractor having a driver's platform which is movable relative to the tractor frame to permit various implement attachments to be placed on an upper surface of the tractor. As variously shown, a driver's cabin which includes controls for the various tractor members and for steering, may be vertically adjusted and repositioned by movement of arms which are secured for pivoting about a generally horizontal axis. Falcone et al. (U.S. Pat. No. 3,841,429) discloses a vehicle such as a straddle carrier which has a driver's cab slidably received on top of a frame structure. The cab is preferably mounted on rails and the seat within the cab is rotatable.

Other known self-propelled vehicles or tractors have hitch arrangements which are variously adjustable. Examples of such are Bagno (U.S. Pat. No. 3,570,614); van der Lely (U.S. Pat. Nos. 4,648,472; 4,576,394; and 4,585,084); and Tatianko et al. (U.S. Pat. No. 3,664,431). While some of such exemplary patents disclose front and rear attachments for dual implement use, the illustrated tractors are generally not suitable for meeting high crop clearance requirements, and their implement interface versatility is generally too limited to provide a multipurpose tractor capable of efficiently performing varying desired operations.

One example of a self-powered agricultural implement adapted for use with relatively tall crops such as corn is Finley (U.S. Pat. No. 2,504,403). With the Finley construction, a large three-wheeled configuration is provided in which the operator sits high atop the overall framework, generally similar to operator seating for the high clearance machinery "Hi-Trac" Models 4400 and 4410 by Powell Manufacturing, as well as for van der Lely (U.S. Pat. No. 3,721,077) and Falcone et al. (U.S. Pat. No. 3,841,429), all referenced above. Finley incorporates a direct chain drive to the front of his three-wheel arrangement.

Other prior arrangements of general background interests are Johnson et al. (U.S. Pat. No. 2,513,942); Claas et al. (U.S. Pat. No. 2,888,088); Ashton et al. (U.S. Pat. No. 3,324,635); Ashton et al. (U.S. Pat. No. 3,324,637); Stott et al. (U.S. Pat. No. 3,425,194); and Doyen et al. (U.S. Pat. No. 4,632,200).

SUMMARY OF THE INVENTION

The present invention recognizes and addresses various of the foregoing problems, and others, concerning multi-purpose agricultural tractors and related operations therewith. Thus, broadly speaking, a principal object of this invention is an improved multipurpose agricultural tractor, and enhanced operations therewith. More particularly, one main concern is improved multipurpose horticultural crop tractors, including clearance and implement mounting features thereof, and improved operator visibility for greater operational safety and efficiency.

It is another broad object of the present invention to provide an agricultural tractor with improved operator visibility generally, both for improved operator safety and convenience; wherefore, operator efficiency can also likely be favorably influenced. It is a more particular object to provide for full bidirectional operational control for an operator. In other words, it is desired that the operator be able to select and fully reorient the directional orientation of the operator station, without suffering distractions due to resulting relative relocation of controls.

It is a further, and alternative present object to provide a movable operator station (fully self-contained as to tractor controls) which may be entirely and selectively repositioned about the frame of a tractor, generally in a given horizontal plane.

It is another general object to provide an improved tractor with adequate clearance and implement mounting features to permit efficient conduct of virtually all phases of operations involving intensive horticultural crops such as vegetables, small tree crops, berries, and ornamentals. It is a more particular object to provide a new field-power unit which offers a wide wheel base width or span for controlled traffic/controlled compaction farming while allowing the performance of all field production operations including harvesting and materials handling. It is a further, more particular object to provide new, improved field-power units for vegetable crops generally, which units are compatible with controlled traffic production schemes and simultaneously perform basic field operations such as including harvesting, materials handling, and field packing.

It is another object to provide an improved agricultural tractor wherein the operator station is both bidirectional and readily movable generally to selected locations to allow optimum operator visibility of critical operations, performed from front, intermediate, or rear located hitches provided for mounting conventional implements such as for tilling, planting, cultivating, fertilizing, spraying, and the like. Such hitch mounts are further preferably adjustable between low and high clearance positions, to accommodate such implements as mechanical harvesters for high crops.

Still another more particular object of the present invention is to provide improved features which may be readily retrofit for modifying existing agricultural power units with such improvements, whereby final commercial cost may be held relatively lower and grower interest stimulated to be relatively higher. In addition, it is a more particular object to provide tractors with a span or wheel width which would support controlled traffic crop production while being compatible with common row/bed widths in conventional tractor wheel spacings, thereby allowing for heavy tillage or emergency operations with conventional tractors.

It is yet another more particular object to provide an improved tractor with lift unit features for the mounting and use of mechanical harvest mechanisms, harvest-conveyors, harvest-aids, and field packing components, as well as for alternative mounting of bulk handling mechanisms (e.g., sprayers) for liquids (such as chemicals, transplanting/produce washing water), and bulk handling of harvested products.

Additional objects and advantages of the invention are set forth, or will we apparent to those of ordinary skill in the art, from the detailed description which follows. Also, it should be appreciated that modifications and variations to the specifically illustrated and discussed features hereof may be practiced in various embodiments and uses of this invention without departing from the spirit and scope thereof, by virtue of present reference thereto. Such variations may include, but are not limited to, substitution of equivalent means and features for those shown or discussed, and the functional or positional reversal of various parts, or the like.

Still further, it is to be understood that different embodiments, as well as different presently preferred embodiments, of the present invention may include various combinations of presently disclosed features, or their equivalents (including combinations not expressly shown or stated). One exemplary such embodiment of the present invention relates to a multipurpose tractor, comprising a frame with wheel means and wheel-driving engine means supported thereon, such frame being adapted for attachment of differing farming implements thereto; an operator station supported on such frame, and including therewith steering means for steering the wheel means, and control means for operating the engine means, for controlling movement of the tractor; and support means for supporting the operator station such that the station is movably mounted on the frame within a generally horizontal plane. Such movability for operator-selected positioning of the operator station and means included therewith relative the frame provides enhanced operator safety and performance as the tractor is operated with differing implements attached thereto.

In another present exemplary embodiment of a multipurpose tractor having a frame and operator station and means included therewith generally as referenced above, there is further provided boom means generally having respective first and second ends, with the first end being pivotably attached to the frame for selected positioning of the second end relative thereto. In such embodiment, preferably the operator station and means included therewith are preferably supported on the boom means second end, whereby selected positioning of the boom means permits corresponding selected positioning of the operator station relative the frame. Such boom means features may be practiced separately or in combination with bidirectional rotatability of the operator station.

Yet another construction comprising an exemplary present embodiment pertains to a multipurpose farming tractor preferably including a main body frame having wheels and a controllable engine for driving same, such frame defining a generally longitudinal axis with respective forward and rearward ends; lift means supported on the frame rearward end and adapted for controllably lifting objects in a generally vertical plane, and including a pair of rearward-projecting lift arms with adjustable horizontal spacing for use with different devices and implements; and further combined with bidirectional operator station means carried on the frame for full bidirectional operational control of the tractor.

Still another present exemplary embodiment in accordance with this invention concerns a multipurpose agricultural tractor adapted for use with different farming implements selectively associated therewith. Such a tractor preferably includes a main body frame having wheels and motive power means, and implement hitch means supported in an intermediate portion of the frame and adapted for removable support of an irrigation hose drum thereon. Further preferably included are vertically adjustable lift means carried on the main frame and adapted for receipt of an irrigation sprinkler system carried thereon and operatively associated with an irrigation hose associated with an irrigation hose drum carried on the frame. Such an outfitted tractor may be selectably used as a mobile irrigation system providing vertically adjustable nozzles for improved spray control, and thereafter outfitted with alternative implements for performance of other farming operations.

Still further, another present exemplary construction in accordance with certain aspects of the present invention pertains to a multipurpose horticultural crop tractor comprising a main body frame, wheel means and associated controllable motive power means, an operator station and associated control means, and implement interface means. With such tractor, the main body frame preferably has a relatively high clearance substantially horizontal operational support surface and defines a generally open framework therebeneath. The wheel means and associated controllable motive power means are preferably mounted on the main body frame for controlled self-propulsion of such frame. The operator station and associated control means are also supported on the main body frame for controlling propulsion thereof. Lastly, the implement interface means are supported on the operational support surface and preferably adapted for selected operative interface and association with different farming implements. With such an arrangement, the multipurpose tractor may be alternatively outfitted with different implements for performing alternative farming operations while satisfying either low clearance or high clearance requirements.

Those of ordinary skill in the art will better appreciate the features and aspects of such embodiments, and others, upon review of the remainder of the specification.

BRIEF DESCRIPTION OF THE DRAWINGS

A full and enabling disclosure of the present invention including the best mode thereof, directed to one of ordinary skill in the art, is set forth in the remainder of the specification, which makes reference to the appended figures, in which:

FIG. 13 is a generally rearward view of an embodiment similar to that of present FIG. 12, in an unloading operation configuration using a live bottom container or the like;

Figure 1:
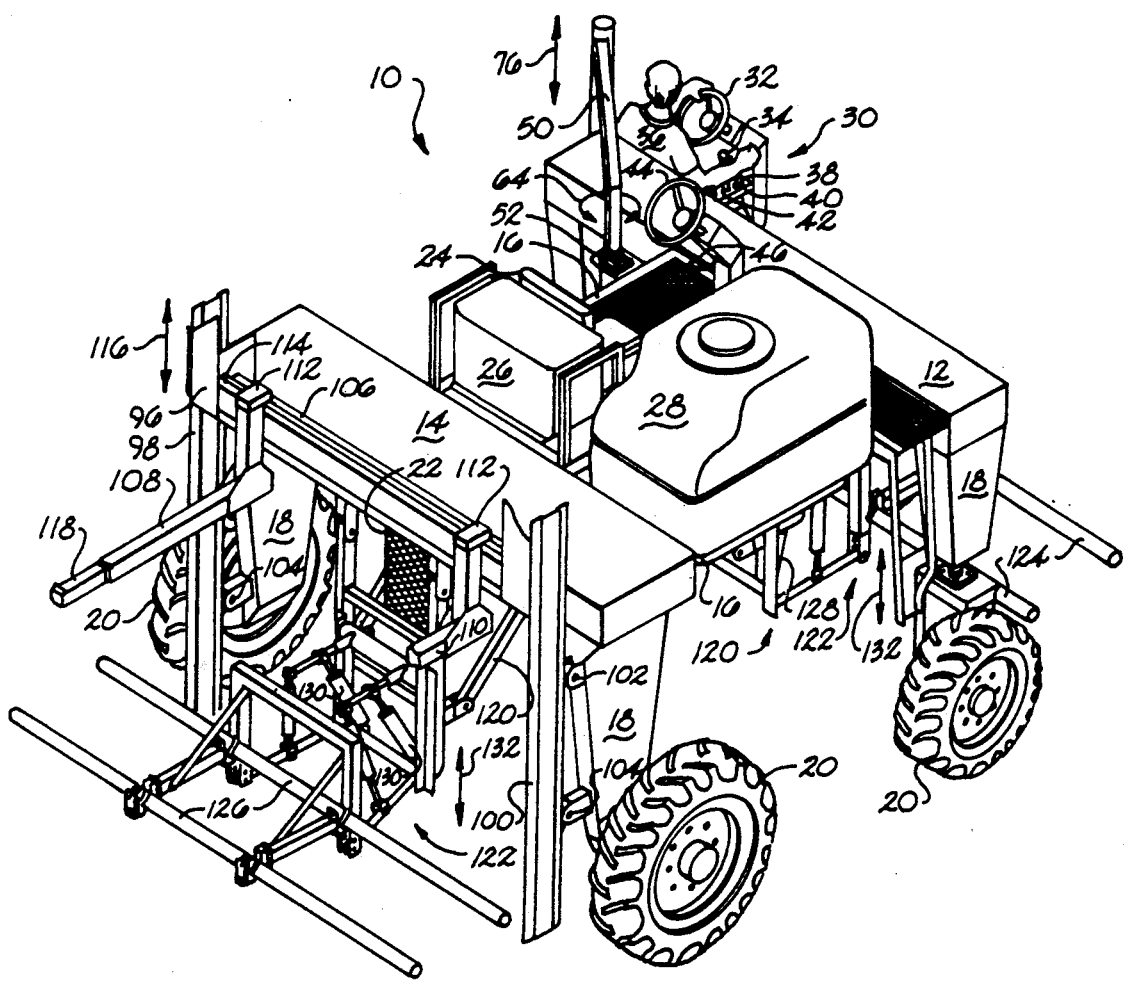
FIG. 1 is a general plan view of an exemplary multipurpose horticultural crop production tractor in accordance with the present invention, generally taken from a rearward view thereof.

Repeat use of reference characters throughout the present specification and appended drawings is intended to represent same or analogous features or elements of the invention.

DETAILED DESCRIPTION OF THE PREFERRED EMBODIMENTS

While the present invention has numerous alternative features which may be variously combined to form present (as well as nonillustrated) exemplary embodiments, those of ordinary skill in the art will appreciate that the following specific constructions are by way of example only, and are not intended to limit broader aspects or alternative constructions of the invention.

Figure 2:
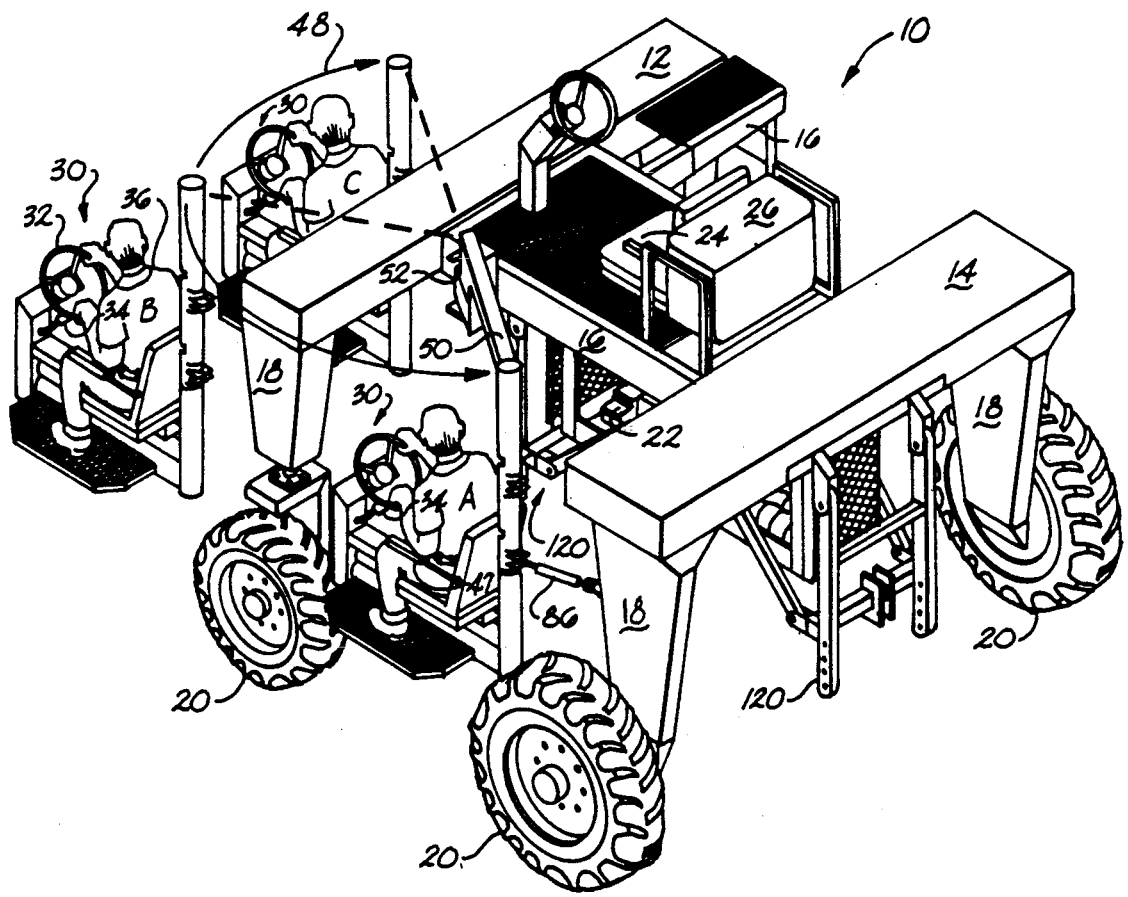
FIG. 2 is another plan, generally rearward view of an exemplary present tractor similar to that as shown in FIG. 1, and more particularly illustrating certain present movable operator station features.

FIGS. 1 and 2 illustrate generally rearward, perspective views of a first exemplary embodiment of a given tractor 10 outfitted in accordance with the present invention. In particular, FIG. 1 illustrates such tractor combined with attached front and rear three-point hitch arrangements and a rearward lift means, while FIG. 2 more particularly illustrates certain movable operator station features in accordance with this invention.

The basic tractor frame of the exemplary embodiment of present FIGS. 1 and 2, as well as the wheel means and wheel-driving engine means thereof may comprise various constructions, but in such illustrations they are represented with features generally shared with a "Hi-Trac" Model 4410 sprayer made by Powell Manufacturing Company, Inc. In general, such tractor 10 has a main body frame comprising front and rear horizontal members 12 and 14, a relatively high clearance substantially horizontal operational support member or surface 16, and various generally upright wheel connection struts 18. Preferably, such vehicle has a crop clearance of approximately 1.8 meters between the ground and the main frame (i.e., members 12, 14, and 16 thereof), and a 3 meter wheel width to permit spanning of two adjacent conventional 1.5 meter width crop beds. Wheels 20 may comprise conventional tractor tires, or other equivalent wheel means, including trac drives, moving treads, or the like.

Tractor 10 preferably further includes a four-wheel drive hydrostatic transmission and hydraulic pump units for powering auxiliary hydraulic actuators, all of which are generally conventional, and details of which do not form particular aspects of the present invention wherefore no more detailed discussion is necessary for an adequate disclosure to one of ordinary skill in the art. Various controllable engine means for driving tractor 10 such as a 59 kw diesel engine 22 which comes with the Powell Model 4410 sprayer may be used. As represented in the embodiment of FIGS. 1 and 2, such engine may be received on the lower side of horizontal support surface 16, though other placements of various engine means may be practiced in accordance with this invention preferably so long as the framework of the tractor is generally open beneath such horizontal support surface to make room for other high clearance or low clearance structures as discussed below.

Because the exemplary embodiment of present FIGS. 1 and 2 incorporates general illustration of the Powell Model 4410 sprayer, an original, fixed operator station 24 above support surface 16 is presently represented. While inclusion of station 24 is not a requirement, such operator station may be practiced with various embodiments of the present invention, particularly for accommodating various spraying operations (such as discussed below, with general reference to FIGS. 15 and 16) or similar activities where a high level driver view would be desired for safety and/or convenience reasons.

An exemplary engine fuel tank 26 may be supported on horizontal support surface 16. FIG. 1 more particularly illustrates a relatively large liquid container 28 which may be used in connection with various spraying operations such as spraying chemicals or watering operations.

In accordance with this invention, tractor 10 has been modified for inclusion of a second, movable operator's station 30 which may entail numerous different, as well as alternative, features in accordance with this invention. In general, such operator station 30 is supported, directly or indirectly, on the frame of tractor 10. Also generally speaking, such operator station preferably includes for movement therewith adequate means for controlling operation of tractor 10 such as steering and forward and reverse movement.

For example, steering means 32 may comprise hydraulically connected steering mechanisms operatively associated with a power steering unit forming part of the original, fixed operator station 24. Hydraulic connections are generally well known to those of ordinary skill in the art, and particular details thereof do not constitute specific aspects of this invention, wherefore no further description of such is necessary for an adequate understanding of this invention by those of ordinary skill in the art.

Similarly, throttle controls 34 may be variously mounted or otherwise supported on or with movable operator station 30 for movement therewith. Such throttle control preferably interconnects with controllable engine means 22 to permit an operator 36 to control tractor 10 from movable operator station 30. By providing all such necessary controls integrally with a movable unit or station, the safety and efficient performance of operator control is enhanced while at the same time providing the desired movability features. In other words, the operator will not become distracted during the course of operations by having to concentrate on relocated controls or the like since they all move integrally with position 30.

Other control mechanisms which may be associated with this invention are represented in present FIG. 1, and may include for example controls for the hydrostatic transmission so that the direction and speed of travel of tractor 10 may be specified. For example, a joystick electrical control 38 or the like for such hydrostatic transmission may be provided on a portable control box 40. Such control box 40 may also be provided with toggle switches 42 or similar devices for operation of hydraulic implement features as discussed below. By providing a portable control box 40, an operator may actually control various functions of implements, such as raising or lowering same, from a ground position closer to such actual operations. Of course, as an operator 36 returns to the original fixed operator station 24 (if provided and used), portable control box 40 can be removed thereto so that all available control functions including steering means 44 and throttle means 34 may likewise be operated from the original station 24. Box 40 may be either direct wired or even wireless. If direct wired, it may alternatively be fitted with a plug-type base for being plugged in at different locations on the tractor. Also, plural boxes 40 may be used at different locations on a given tractor.

Other features may be variously practiced as desired for added operator safety. For example, rearview mirrors or safety belts (not shown) may be used at either operator station. Still further, a containment member such as seat arm 47 may be made pivotable and provided with a microswitch so that arm 47 must be in the illustrated down position in order for an operator to be able to crank engine means 22.

As represented by curved arrow 48 of FIG. 2, movable operator station 30 may be moved continuously to any one of a number of operator-selected positions (such as positions A, B, and C of FIG. 2 or any intermediate positions therebetween) all of which are generally in the same horizontal plane. Boom means 50 has two respective ends, one of which is pivotably attached to the frame of tractor 10 for controlled rotational movement about a generally vertical axis 52 thereof. Additional details of such movement and adjustability are discussed below in connection with reference to FIGS. 3A and 3B. However, the perspective view of FIG. 2 illustrates repositioning of operator station 30 relative the frame of tractor 10 resulting in desired enhanced viewability of various operations which may be practiced with different implements associated with tractor 10, in accordance with other, separate aspects of the present invention as discussed below. The advantages of such improved operator viewability are virtually self-evident, and would differ in specifics with each particular implement and corresponding farming operation conducted with tractor 10. However, each selected position would share the general advantage of improved operator safety and performance (subjectively and/or objectively) by virtue of greater operator viewability, either through more direct-line viewing of a given operation, closer viewing of a given operation, or both.

Figure 3A:
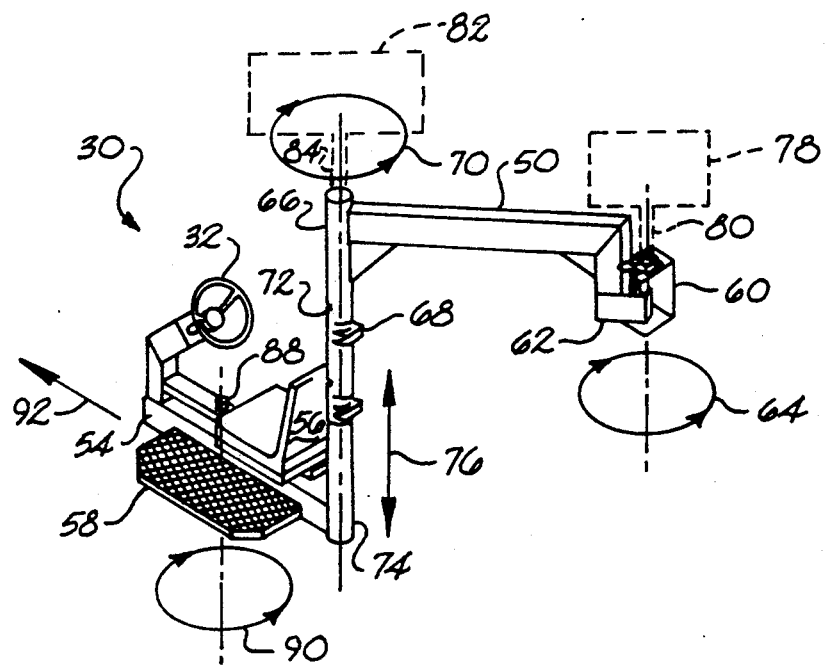
FIGS. 3A and 3B are isolated views of combined boom means and bidirectional operator station features in accordance with the present invention, as integrally incorporated into the exemplary embodiments of FIGS. 1 and 2.
Figure 3B:
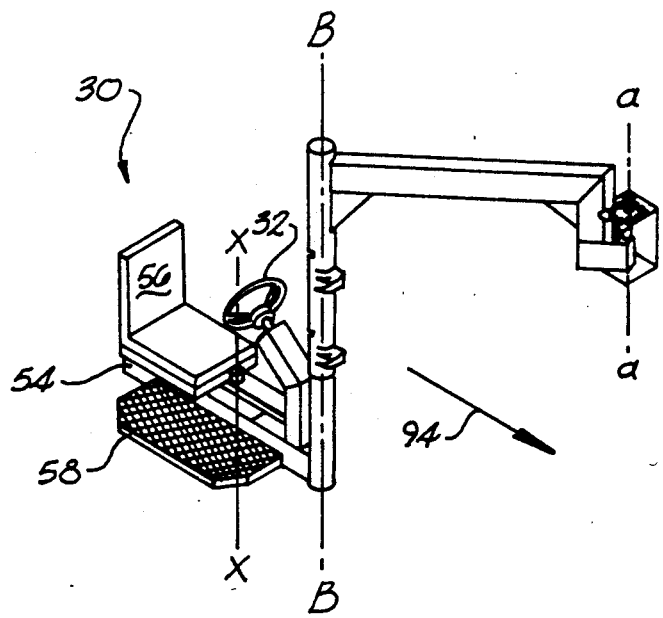

Referring now to such FIGS. 3A and 3B, a movable operator station 30 is illustrated in isolation, separated from a tractor 10 to facilitate illustration and discussion of more particular features thereof. For clarity, such operator station 30 is only generally represented with a base framework 54, operator seat 56, steering means 32, and footrest 58.

As represented in FIGS. 3A and 3B, the exemplary movable operator station embodiment therein may be provided with a plurality of adjustment axes, with various different combinations of such illustrated features forming different embodiments of the present invention. In the illustrated example, support means in accordance with the present invention may include a pivot mounting 60 which in turn is preferably secured to some portion of the framework (i.e., a support area of the frame) of tractor 10 as represented in present FIGS. 1 and 2. By selecting the placement of pivot mounting 60 relative the frame of tractor 10, the different positions into which operator station 30 may be moved are preselected.

Pivot mounting 60 defines a generally vertical pivot axis "$\alpha$" (see FIG. 3B). Such $\alpha$ axis permits rotation of one end generally 62 of boom means 50 thereabout as represented by the circular arrows 64. A free or second end generally 66 of boom means 50 is variously associated (either directly or indirectly) with movable operator station 30 for supporting same. Accordingly, as boom means 50 is pivoted about the $\alpha$ axis, movable operator station 30 moves with free end 66 so as to be correspondingly selectably positioned relative the frame of tractor 10.

Operator station 30 may be supported on free end 66 of boom means 50 through interconnection with a substantially vertical support mast 68, which may itself be pivotably mounted relative boom means 50 about a substantially vertical axis "$\beta$." Circular arrows 70 represent the relative movement potential of framework 54 relative the $\beta$ vertical axis. As further represented, vertical mast 68 may comprise two tubular telescopically related members 72 and 74 which may be used advantageously to provide rotatability about the $\beta$ axis, or to provide vertical adjustability of station 30 in an axial direction along such axis.

For example, the relatively smaller diameter telescoping member 74 may have an end thereof which reaches to the top of member 72 and which may be fixably secured thereat by a bolt or the like. By loosening such bolt, an operator could rotate station 30 about the $\beta$ axis and reposition same as desired, and thereafter resecure such bolt for safe operation of tractor 10. Alternatively, or in addition thereto, telescopic members 72 and 74 may be related to one another in a screw or other journaled fashion so that respective relative rotation or other predesignated movement therebetween along the $\beta$ axis causes relative axial movement in the direction of double-headed arrow 76. Such raising or lowering of station 30 would depend respectively on the direction of relative rotation of such members, or other internally received and rotatable members for effecting such vertical adjustability feature.

While such rotatable adjustability features relative the indicated $\alpha$ and $\beta$ axes may be used independently to good advantage, it is generally preferred that adjustments at both such axes be made in conjunction with one another for movement of operator station 30 from one position to another, such as represented by positions A, B, and C in present FIG. 2. Thus with adjustment at such two axes the position of movable operator station 30 relative the frame of tractor 10 can be changed without necessarily changing the directional orientation of such station. In other words, in each of the positions A, B, and C of FIG. 2, the operator station 30 remains in a generally forward-oriented direction relative the longitudinal axis of tractor 10. Such longitudinal axis is defined by the aligned direction of wheels 20 of such tractor 10 with movable operator station positions B and C being at the front of the tractor, and position A being along the side of such tractor in an intermediate area between the front and rear tires thereof.

Still further in the alternative, either one or both of the adjustment features relative the $\alpha$ and $\beta$ axes may be provided with power rotation means or the like for controllably driving rotation of the respective members at such axis. For example, a power rotation means 78 and drive shaft 80 associated therewith may be provided for rotation of the $\alpha$ axis, while a further, separately controlled power rotation means 82 with its own drive shaft 84 may be similarly provided for rotation of $\beta$ axis. Details of such power rotation means form no particular aspects of the present invention, and may vary from one embodiment to another. However, one exemplary construction could comprise a rotary drive shaft with a hydraulic motor means or its equivalent for rotating respective members about their respective axis.

Since it is not necessarily envisioned that movable operator station 30 will be repositioned during movement or operation of tractor 10, actual manipulation of station 30 may be accomplished manually, rather than requiring power drives. For the sake of simplicity and lower cost, manual repositioning of station 30 is one preferred embodiment and may optionally be supplemented with a bracing member 86 such as an adjustable turnbuckle or the like (see FIG. 2) for interconnecting between such station 30 and the framework of tractor 10 for securement of such station once positioned as desired.

Yet another adjustability feature which may be practiced separately in accordance with this invention, or in combination with various of the foregoing movable operator station features, relates to bidirectional rotatability of movable operator station 30, such as about substantially vertical pivoting axis "X" (see FIG. 3B). As represented, such axis of rotation preferably is substantially central to station 30 so that rotation of such station in its entirety is accomplished in a minimum amount of space. Such location of pivot axis 88 permits the station to be rotated relative the base framework 54 thereof, so that full bidirectional operability may be provided even within relatively tight areas, such as in the intermediate area between the front and rear wheels in position A as represented in present FIG. 2. As is apparent from such FIG. 2, if such bidirectional feature were provided only through rotation about axis $\beta$, there would be insufficient room between the front and rear wheels in order to effect full bidirectional rotation. In certain circumstances, for example, if there were adequate room, use of pivot axis $\beta$ for the bidirectional feature would be acceptable. However, with rotation about axis "X" generally in the direction of circular arrows 90 providing the bidirectional feature, such problems are avoided. Without discussing details, those of ordinary skill in the art will further appreciate that such bidirectional pivot mounting may be variously accomplished and provided either through manually actuated or power driven means.

The illustrated orientation of station 30 in present FIG. 3A is preferred whenever the tractor is primarily operated for movement in the direction of arrow 92, while the illustrated orientation of station 30 in present FIG. 3B is preferred whenever the tractor is primarily operated for movement in the direction of arrow 94. Such selected directional orientation in accordance with the present invention, by providing full operational bidirectional features, results in improved operator safety and performance not heretofore generally provided by conventional agricultural tractors. By further combining the bidirectional capabilities of station 30 with reference to pivot axis "X" thereof with the above features described with reference to pivot axes $\alpha$ and $\beta$, operator safety and performance is still further enhanced by providing for both selected positioning and directional orientation of such movable operator station.

For clarity in the foregoing illustrations and their related discussions, electrical wiring harnesses, hydraulic connections, and the like, as would be well known to those of ordinary skill in the art, have been omitted. It should be understood that such standard interconnections may be provided at least in part either externally or internally relative the frame of a given tractor. For example, the hydraulically-based wheel drive features of the Powell Machinery tractor features of FIGS. 1 and 2 are in part contained within the wheel strut support members 18, and are therefore not separately illustrated.

Apart from movable operator station features, or in combination therewith, various embodiments of the present invention may be provided with rear loader or lift means features 96 (see FIG. 1). In general, such lift means may comprise a pair of substantially vertical members 98 and 100 which are preferably removably mounted on the framework of tractor 10, such as at connection mounts 102 and 104. Essentially, members 98 and 100 define channels within which a substantially vertically movable trac 106 is received. To such point, members 98, 100, and 106 are generally known, and are available for example as an optional feature on the "GENERATION III" tobacco combines of Powell Manufacturing Company, Inc. Such a cable driven or the like lift means may be practiced as rear lift means 96 in accordance with this invention.

It is further known to provide such a vertically drivable trac with rearward projecting lift arms. In this instance, improved lift arms 108 and 110 (shown in partial cutaway) are provided in accordance with this invention so as to be horizontally adjustable on the trac 106. By providing overhanging lips 112 which engage a corresponding top flange or lip 114 of trac 106, lift arms 108 and 110 may be slidably received along such trac for respective horizontal repositioning. Such improvement is significant in that it permits lift means 96 to be used for lifting a variety of bulk handling containers, live bottom containers, or other available implements, thereby facilitating the intended multipurpose mission of a tractor 10. Lift arms 108 and 110 are vertically adjustable in the direction of double-headed arrow 116, so that for example crop handling containers or other planar surfaces such as a live bottom device may be used as a harvest-aid for either low clearance or high clearance crops.

It is to be understood that other implements, such as related to irrigation or spraying systems may also be alternatively mounted on lift arms 108 and 110 and likewise vertically adjusted as desired. Also, lift arms 108 and 110 may include telescopically related members, such as 118 so that the rearward projection thereof may be adjustable. By providing for horizontal repositioning of such lift arms, safety and serviceability are enhanced because the lift arms can be best positioned for matching the spacing of lifting surfaces for each implement or device with which it is used. Lift means 96 may be totally or partly removed when desired, such as through removing members 98 and 100, or through only removing trac 106.

Further independent aspects of the present invention pertain to providing for the attachment of various and differing farming implements to a tractor, particularly one accommodating high clearance conditions. As represented generally in FIG. 1, implement hitch means 120 may be provided preferably on an underside of horizontal support surface 16. Such implement interface or hitch means 120 are discussed in greater detail below with reference to FIGS. 4 through 7, but generally provide for the selected removable attachment of various implements to both the front and rear of tractor 10.

FIG. 1 illustrates such implement interface means with conventional three-point hitches 122 attached thereto, while FIG. 2 illustrates such implement interface means 120 without such attachments. While various hitch mechanisms may be practiced in accordance with the present invention, preferably conventional three-point hitches are used to provide maximum flexibility in outfitting multi-purpose tractor 10 since numerous conventional implements, devices, and farming aids are set up for use with conventional three-point hitches. As illustrated in FIG. 1, front tool bars 124 and rear tool bars 126 provide examples of standard implement interconnection elements which further facilitate numerous alternative usages of multipurpose tractor 10.

Another present aspect of such implement interface means relates to adjustment of attached implements, such as causing the implements to alternately engage or disengage the soil. Such control may be variously effected, such as with remotely operable hydraulic cylinders. For example, the two toggles switches 42 received on portable control box 40 at operator station 30 may be used to respectively control solenoids interconnected with paired hydraulic cylinders 128 at the front of tractor 10 and cylinders 130 at the rear of tractor 10. With controlled actuation of such cylinders, respective front and rear attachments may be raised or lowered generally in the direction of double-headed arrows 132. As discussed above, portable control box 40 may be removed from station 30, for use by a ground-located operator who is closer to either the front or rear implements for improved observation of movement of such implements during actuation of such hydraulic cylinders. Likewise, portable control box 40 may be selectively moved to fixed operator station 24 for operation of such hydraulic cylinders from such position.

Figure 4:
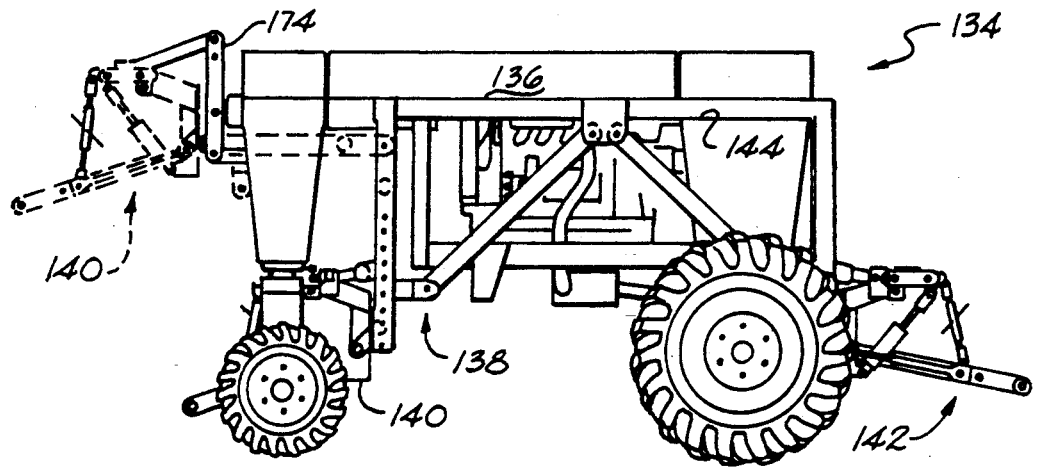
FIGS. 4, 5, and 6 are side, front, and rear views, respectively, of an exemplary tractor frame outfitted in accordance with the present invention with implement interface means, or implement hitch means, for accommodating multipurpose usage of present exemplary tractors.
Figure 5:
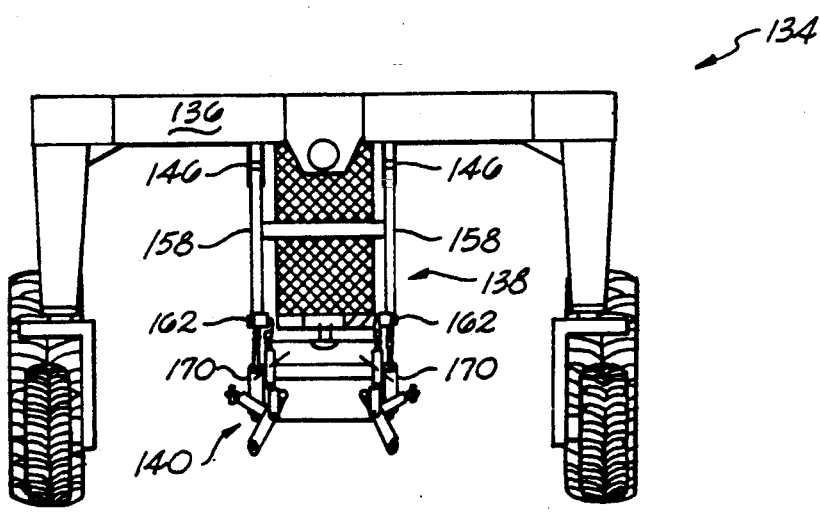
Figure 6:
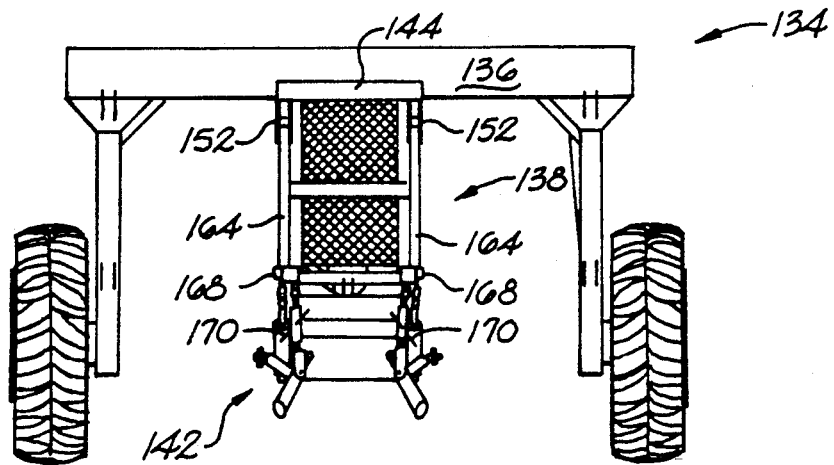
Figure 7:
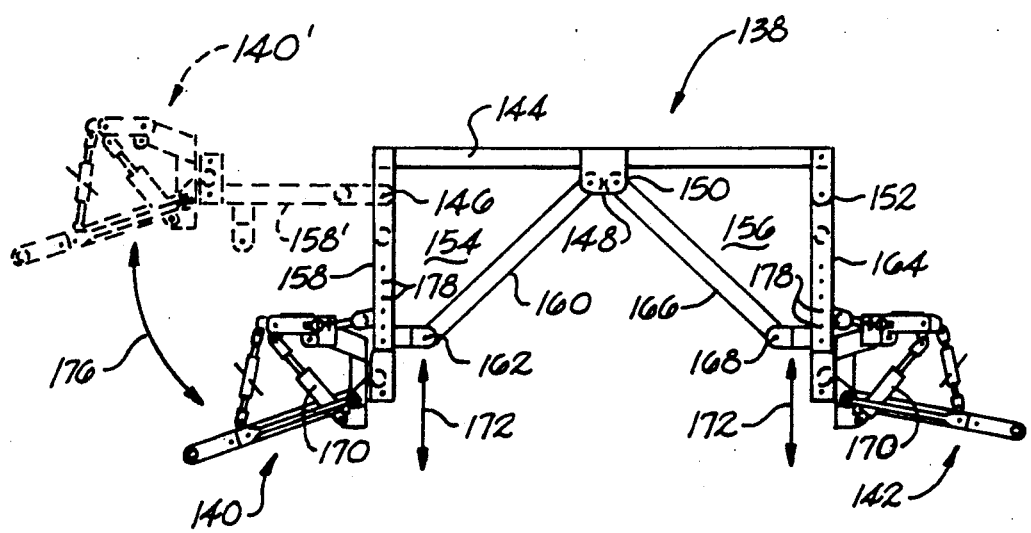
FIG. 7 is a side view of isolated implement hitch means or implement interface means in accordance with the present invention, adapted for use with present exemplary tractor frames.

To better illustrate and discuss implement interface means features in accordance with this invention, reference is made to FIGS. 4 through 7 which show various partial representations of a tractor, so that there is greater clarity of the implement related features. More particularly, FIGS. 4, 5, and 6 are respective side, front, and rear views of a tractor 134 generally of similar construction to that of tractor 10 but with certain features such as operator stations and the like deleted for clarity. As clearly illustrated, a relatively high clearance substantially horizontal surface 136 forms part of a framework defining a generally open area therebeneath within which implement interface means 138 may be received and supported. For greatest clarity, FIG. 7 illustrates such implement interface means 138 in isolation, completely removed from the framework of the tractor but with exemplary only front three-point hitch means 140 and rear three-point hitch means 142 associated therewith. Being generally of conventional construction, no detailed discussion of such three-point hitch means is required for a full and enabling disclosure of the present invention to one of ordinary skill in the art.

With collective reference to such FIGS. 4 through 7, it may be seen that implement interface means 138 preferably are formed with its own framework structure secured to the framework of tractor 134, such as to the underside of horizontal support surface 136. Such securement may be through bolts, welding, or the like, and is generally subject to the particular desires or design constraints of various users of the present invention.

More particularly, a main framework member 144 may be directly attached to the underside of horizontal support surface 136 and define a plurality of paired attachment or support points 146, 148, 150 and 152 thereon. To efficiently provide a strong, underslung support arrangement, respective pairs of such support points 146 through 152 are associated with other support members to form a support triangle, as generally represented in FIG. 7, for each hitch means position. One support triangle 154 is associated with front hitch means 140 while a second support triangle 156 is associated with rear hitch means 142. A pair of support legs 158 and 160 interconnect at a connection point 162 on each lateral side of hitch means 140 (see FIGS. 5 and 7). Likewise, paired support legs 164 and 166 are situated on each lateral side of hitch means 142, and interconnect at respective support points 168 (see FIGS. 6 and 7). Again, respective and controllable hydraulic cylinders 170 associated with each hitch means permit controlled pivoting movement thereof generally in the direction of double-headed arrows 172 (see FIG. 7).

In addition to the readily apparent alternative front and rear mounting of implements in association with implement interface means 138, such means also advantageously permit alternative high clearance or low clearance mountings. In particular, the solid line illustration of hitch means 140 in FIGS. 4, 5, and 7 relates to relatively low clearance mounting. The dotted line illustration of hitch means 140' in both FIGS. 4 and 7 is an alternative relatively high clearance position which may be practiced in accordance with this invention. In particular, such high clearance position may be achieved by decoupling members 158 and 160 at connection point 162, and pivoting member 158 into the dotted line position 158' thereof (see FIG. 7). Thereafter, hitch means 140' may be variously further secured, such as with a bracing member 174 (see FIG. 4) interconnected between such hitch means and the framework of tractor 134. Other alternative, equivalent bracing members may be practiced. Double-headed arrow 176 generally indicates the preferred arc of movement of such hitch means between relatively low and relatively high clearance positions.

Practice of such high clearance position is particularly useful in connection with implements such as harvest heads or other implements for relatively tall crops such as corn and bush or trelised cultivars. Moreover such relatively low/high clearance alternative positions may be practiced at either the rear or front ends of implement interface means 138. Apart from the above-described pivoting action, hitch means and/or implements may simply be initially outfitted on a tractor in accordance with this invention in either high or low clearance positions.

Still another aspect of such implement interface means 138 is represented by the multiple connection or mounting holes 178 represented on members 158 and 164. Such plural holes permit attachment of hitch means at various different levels, all of relatively low clearance type, without detriment to operation of hydraulic cylinders 170. Such features further contribute to the potential for multipurpose usages of a tractor 134 in accordance with this invention.

Those of ordinary skill in the art will appreciate expedient variations to the specific exemplary framework comprising implement interface means 138 herewith which may be practiced without departing from the spirit and broader aspects of this invention. For example, the width of same or the relative lateral location of such may be varied to accommodate particular design criteria. Also, alternative equivalent means for performing the function of the hydraulic cylinders 170 may be provided and variously manually or automatically controlled for desired results when using various implements with tractor 134. It is to be further understood that practice of implement interface means 138 may be alternatively combined with various of the above-discussed features (such as a movable operator station, lift means, or the like) for forming alternative embodiments of the present invention.

Another advantage of the foregoing exemplary embodiments of implement interface means in accordance with this invention is that dual three-point hitches allow simultaneous performance of two separate operations during one trip through a field. The present exemplary embodiment of such means 138 also provides optimum flexibility in mounting of such hitches.

Figure 8:
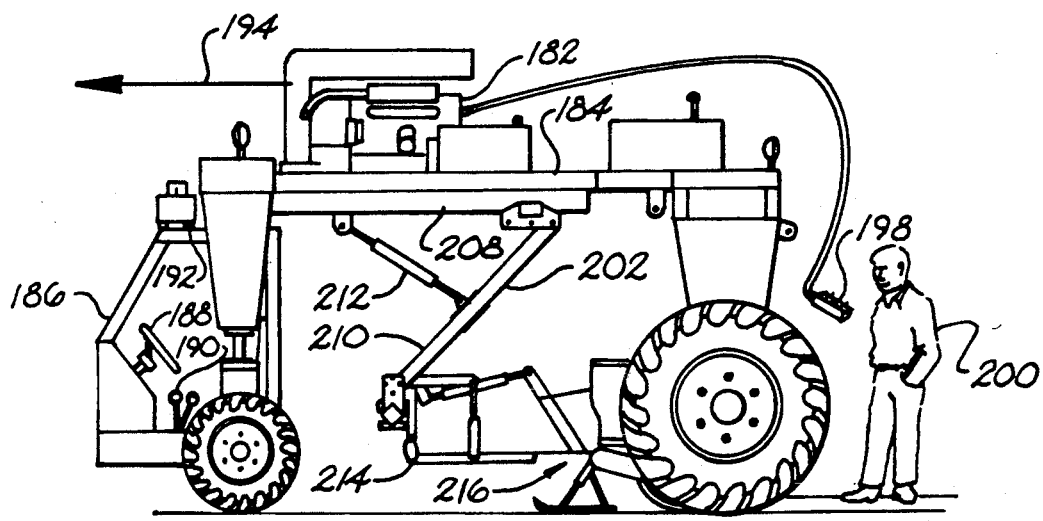
FIGS. 8, 9, and 10 are side views of an alternate exemplary tractor embodiment in accordance with this invention, with alternate constructions of present movable operator station features, illustrating in particular certain bidirectional operator station features, and various alternative implement associations and usages in accordance with this invention.
Figure 9:
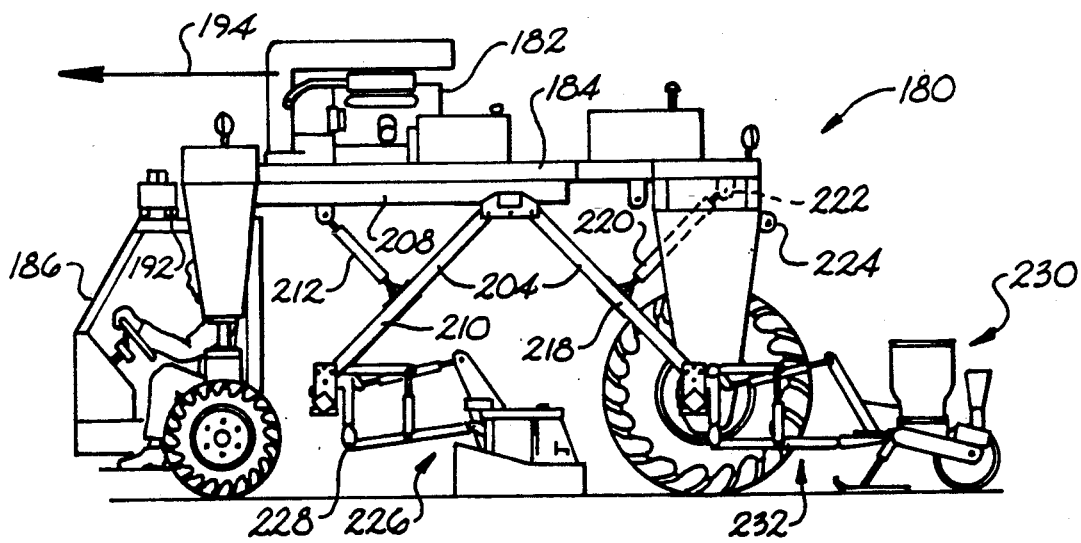
Figure 10:
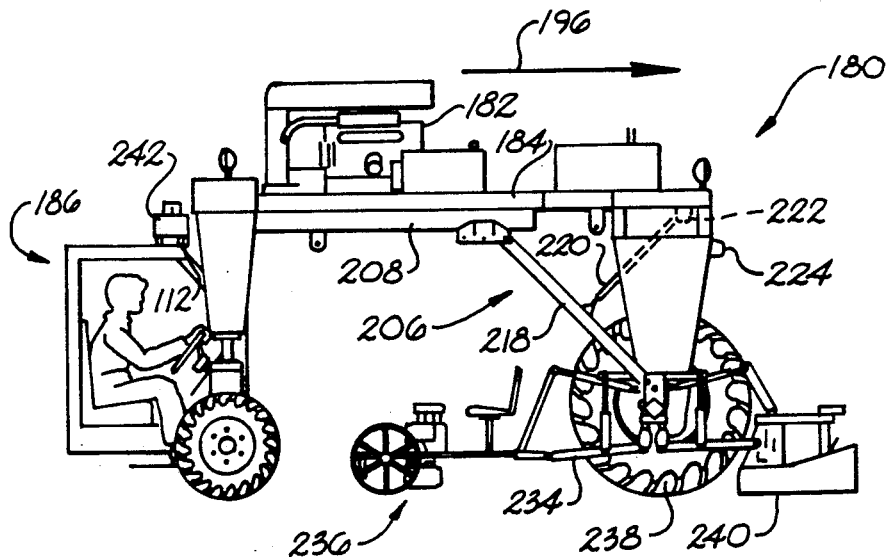

In addition to the above-suggested variations in combinations of different present features, modifications to such respective features may be practiced as presently represented for example, in FIGS. 8 through 10. Such figures represent an alternative tractor construction 180 in accordance with this invention. While various forms may be practiced, the basic tractor as illustrated was modified from a "GENERATION III" tobacco combine marketed by Powell Manufacturing Company, Inc. Such commercially available basic tractor has many features generally similar to those of tractor 10, but has an engine 182 which is mounted above horizontal support surface 184 rather than beneath.

Another difference from tractor 10 insofar as the present invention is concerned pertains to support means for movable operator station 186. In particular, such movable operator station 186 has diagrammatically represented steering means 188 and associated controls means 190 therewith. With such construction, a fully operational bidirectional movable operator station is provided. A pivot connecting member 192 permits the entire directional orientation of such operator station and associated control means to be operator-selected. In FIGS. 8 and 9, operator station 186 is situated so as to be facing in the same direction of forward movement arrow 194. In present FIG. 10, the position of operator station 186 has been reversed so as to correspond with the direction of reverse arrow 196. By providing such an embodiment of a fully operational bidirectional operator station in accordance with this invention, operator safety and performance is enhanced.

As generally discussed above with reference to FIG. 1 and portable control box 40 thereof, a portable control box 198 (with exemplary interconnecting control wires) may be provided so that an operator 200 may control various facets of operation from a remote location relatively closer to farming implements being used (see FIG. 8). Of course, such box can be secured to station 186 for bidirectional orientation and movement therewith.

Additionally, alternate embodiment tractor 180 may be practiced with an alternate embodiment of implement interface means 202. Each of FIGS. 8 through 10 show respectively modified embodiments 202, 204, and 206 for interfacing with various implements. Each alternate configuration is optimally adapted for use with different implements in different circumstances. For example, the construction of FIG. 8 is best utilized with a single implement 216 and tool bar situated in a relative low clearance intermediate position along the framework of tractor 180. The illustrated construction makes use of a fixed framework member 208 (secured to the underside of horizontal support surface 184), a main connecting member 210, and an adjustable turnbuckle member 212, and a conventional three-point hitch 214 secured for support by all of the foregoing.

The single implement 216 is in a relatively intermediate position of tractor 180. FIG. 9 illustrates two implements and tool bars used in respective intermediate and rearward positions relative tractor 180. In addition to presence and use of members 208, 210, and 212, an additional set of corresponding members for the rearward implement are represented by members 218 and 220. Furthermore, member 220 is supported at a connecting point 222 which may be directly secured to the underside of horizontal support surface 184 rather than on separate framework member 208. Connecting member 224 serves as one of a rear-located connecting point for optional support of a rear lift means on tractor 180. The FIG. 9 configuration permits use of one implement and tool bar 226 operatively supported in an intermediate position on three-point hitch 228, and simultaneous usage of a second implement and tool bar 230 attached to a rearward-located three-point hitch 232.

FIG. 10 illustrates a further alternative configuration 206 with a single rearward tool bar operatively associated with two implements. In particular, members 218 and 220 support a first three-point hitch 234 operatively associated with an implement 236, while simultaneously supporting a second three-point hitch 238 operatively associated with a second implement 240. As represented, bidirectional operator station 186 has preferably been rotated for facing such dual implements as tractor 180 is primarily operated in the direction of arrow 196. As generally referenced above in conjunction with the discussion of FIG. 3A, movable operator station 186 may be manipulated through manual actuation, or through use of a power rotation drive means, such as the presently represented drive means 242. In either case, a pivot connection 192 is provided making use of a generally vertical pivot axis for desired manipulation of movable operator station 186 for enhanced operator safety and performance.

Figure 11:
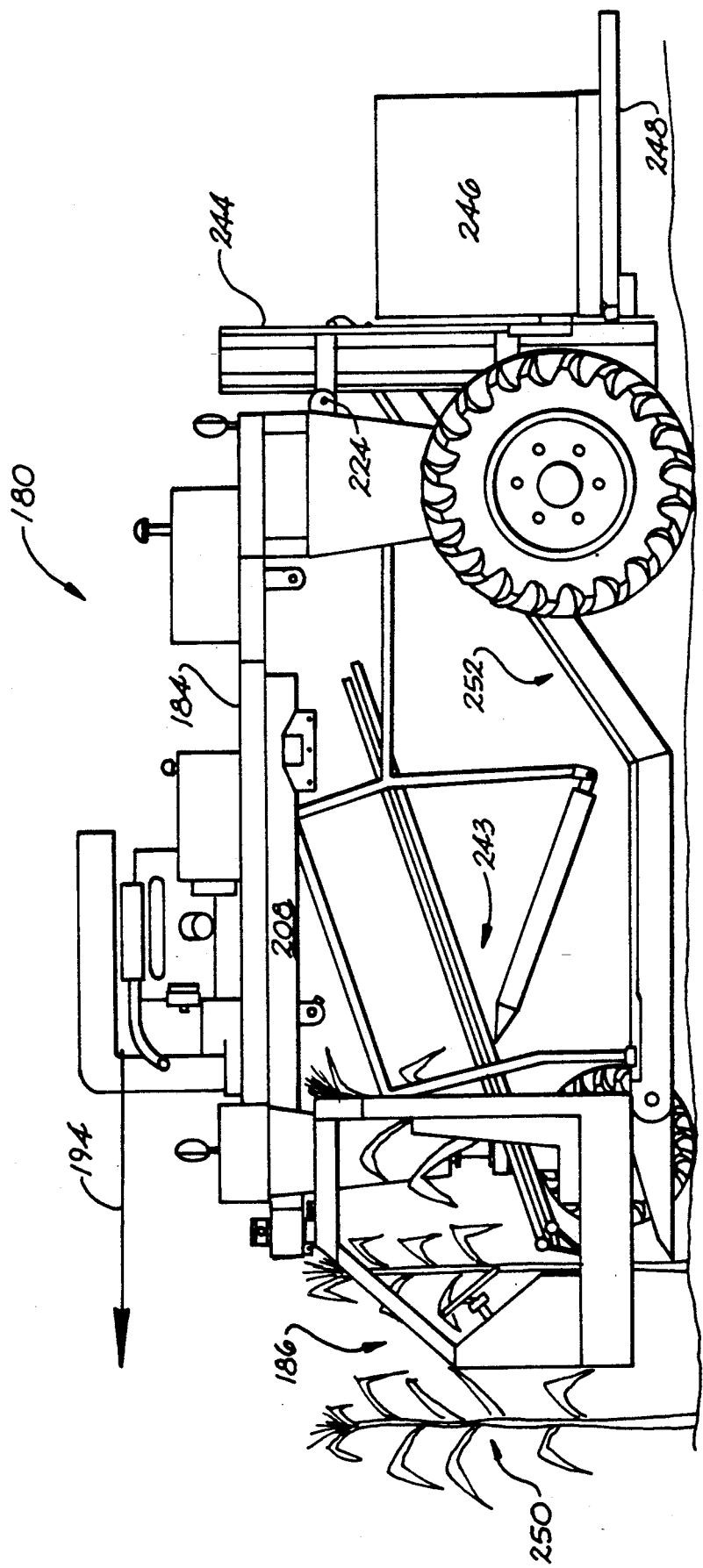
FIG. 11 is a side view of a present exemplary tractor similar to that as shown in present FIGS. 8 through 10, outfitted for particular use with a sweet corn harvester head and rear loader features for bulk materials handling including exemplary lift means in accordance with this invention.

FIG. 11 illustrates yet another exemplary construction comprising an exemplary embodiment in accordance with this invention and includes use of a relatively high clearance corn harvesting head 243 in combination with lift means 244 and a bulk materials handling container 246 supported on lift arms 248 of lift means 244. More particularly, tractor 180 is primarily movable during such operations in the direction of arrow 194, in which direction movable operator station 186 is also preferably oriented. In particular, ears of corn are harvested from corn plants 250 and are forwarded with conveyor belt means 252 upwards and into bulk materials handling container 246 for subsequent unloading. Selected vertical (and horizontal) positioning of lift arms 248 permits ready usage of different sized containers 246 and conveyor belt means 252 with one another. Framework member 208, generally secured to the underside of horizontal support surface 184, facilitates mounting and operative association of implement 243 with tractor 180.

Figure 12:
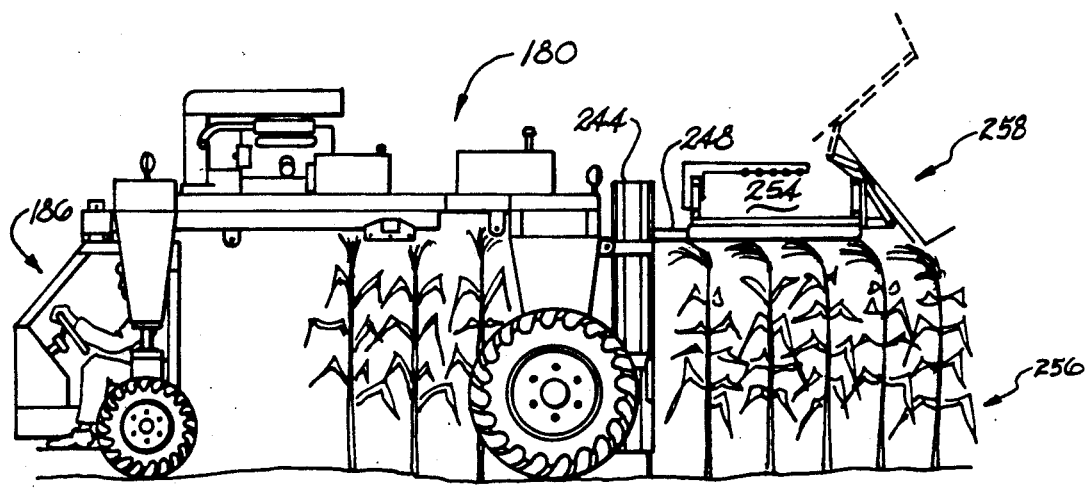
FIG. 12 is a side view illustrating an exemplary tractor embodiment of this invention similar to that illustrated in present FIG. 11, configured for performing harvest-aid methodologies satisfying high clearance crop position requirements.

Such implement 243 permits automated harvesting with tractor 180. Alternatively, present FIG. 12 illustrates tractor 180 configured for use with a harvesting aid mounted thereon. In particular, a conventional bin container 254 with live bottom features is supported on arms 248 of rear-mounted lift means 244. With bidirectional operator station 186 oriented in a forward direction, lift means 244 is vertically adjusted so that the bottom of container 254 strikes the top or tassels of corn plants 256, which bending over of the tops of the plants generally results in improved visibility of the ears of corn to be harvested. Such technique may be practiced in low clearance or intermediate clearance positions with other crops amenable to same. Corn may be harvested by individuals walking behind tractor 180, whereafter the ears of corn are deposited in bin container 254, such as with use of a loading device 258.

Workers may walk behind a container such as bin container 254, for hand harvesting various crops such as sweet corn, melons, squash, peppers, and cucumbers. The vertical position of such container is readily adjusted by operation of lift means 244 for high or low growing crops to provide worker convenience during harvest and container placement/removal from the truck. Unloading of the container is readily accomplished with the multipurpose tractor. Loading devices such as 258 (see FIG. 12) may be hydraulically operated with power from tractor 180 for periodically dumping harvested product into container 254. If desired, such loading devices may be operated between rows of crops and at a lower position than container 254 to assist workers in handling the crop.

Figure 13:
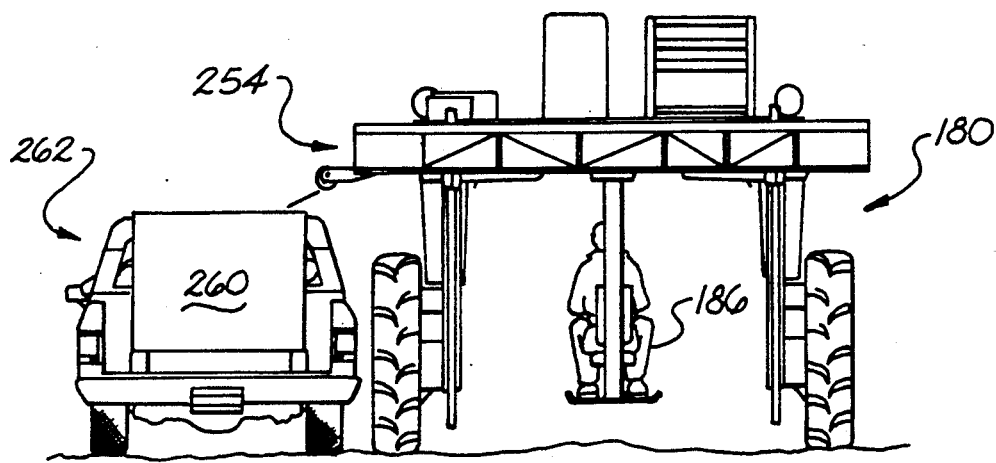

While multipurpose agricultural crop tractor 180 may be configured such as in exemplary FIG. 12 for high clearance crop position operations, other modified configurations may be used. For example, FIG. 13 illustrates operation of live bottom container 254 for emptying harvested crops into a subsequent container, such as bulk container 260 carried on a laterally adjacent truck 262. FIG. 13 also serves to again illustrate the advantages of a generally open framework beneath the horizontal relatively high clearance support surface preferably practiced in accordance with a tractor 180, also having a bidirectional operator station 186.

Figure 14:
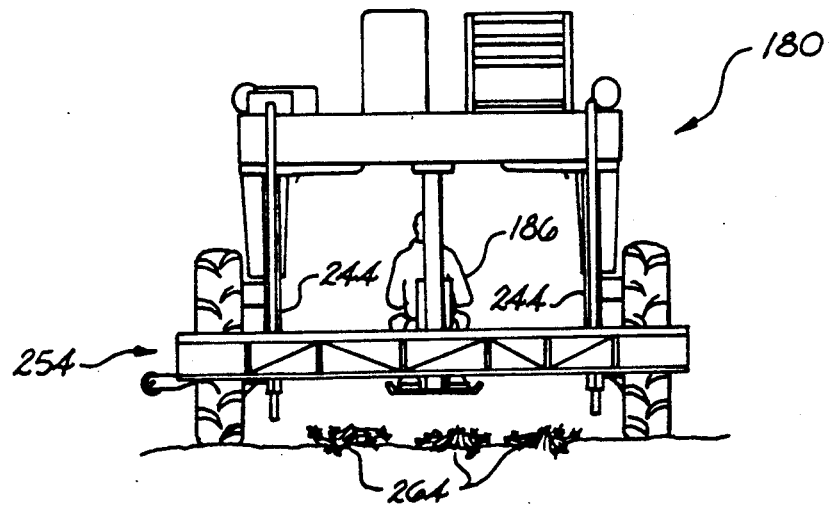
FIG. 14 is a similar rearward view to that of present FIG. 13, illustrating use of such embodiment in harvest-aid operations satisfying low clearance crop position requirements.

FIG. 14 illustrates a present invention configuration generally similar to that of FIGS. 12 and 13, but with container 254 considerably lowered by operation of lift means 244 so as to provide a harvest aid in a low clearance crop position. In particular, low lying crops 264 may be manually harvested and deposited in container 254 for subsequent emptying into a container 260, or the like. Practice of the present invention permits alternative usage of the single multipurpose tractor 180 for low clearance crop conditions or high clearance crop conditions, pickup, unloading, etc., as represented by the above-discussed figures.

Figure 15:
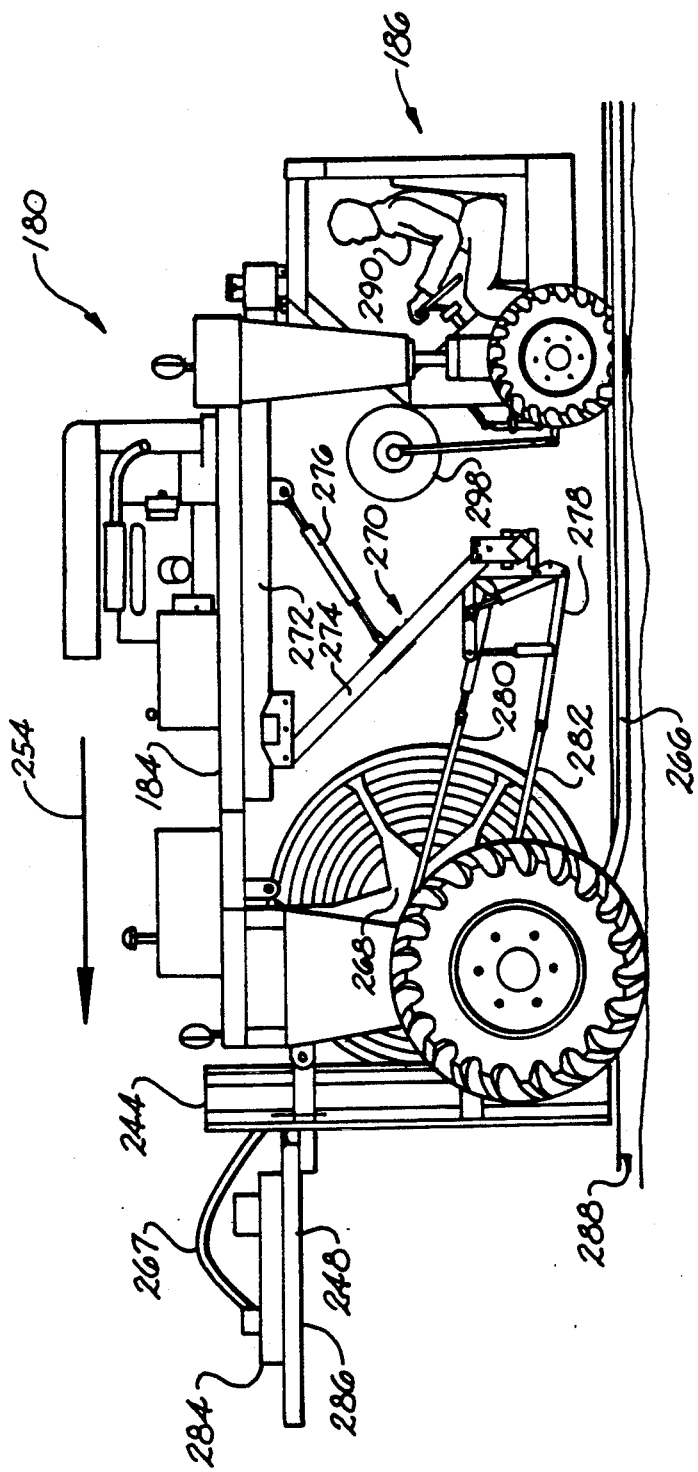
FIGS. 15 and 16 are further side views of a present embodiment similar to that of present FIGS. 8 through 14, configured for mobile irrigation operations, with FIG. 15 particularly illustrating hose deployment operations, and FIG. 16 representing actual irrigation operations making use of vertically adjustable nozzle features and optional automatic steering features.
Figure 16:
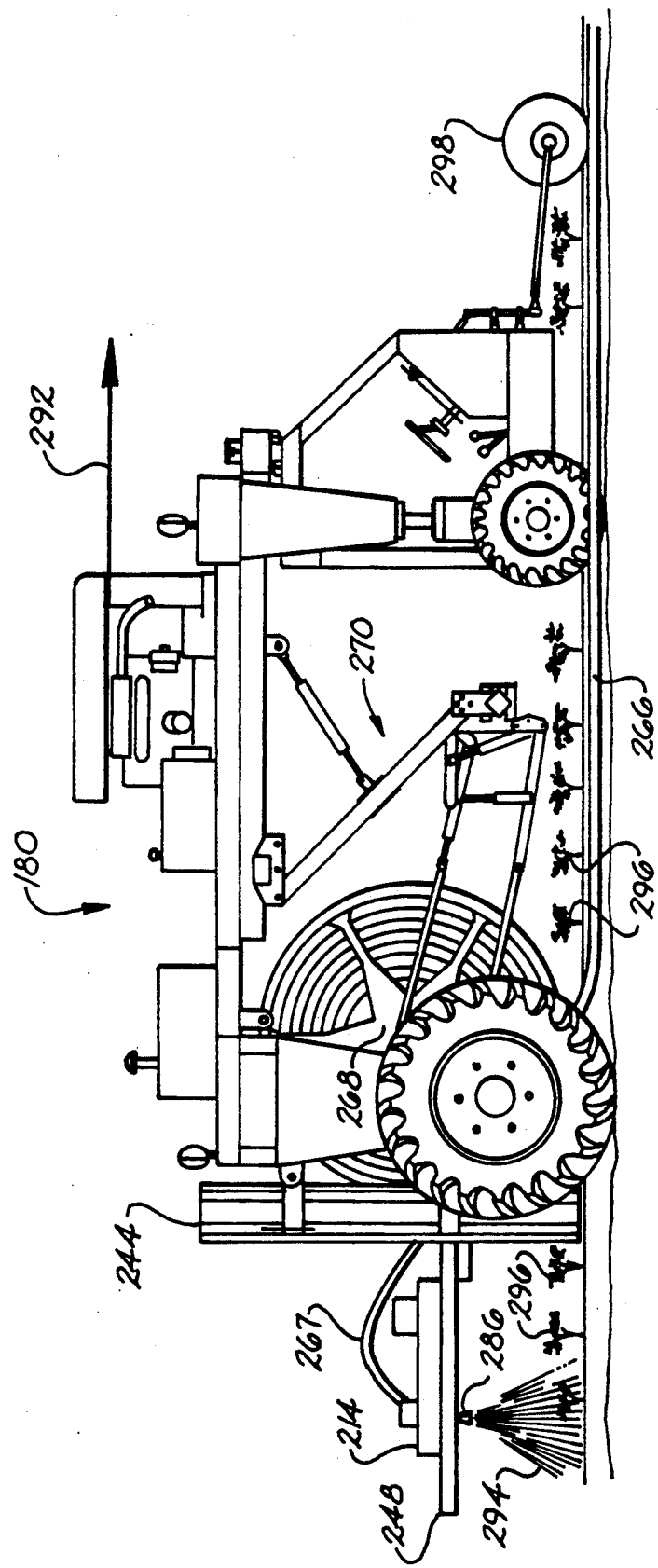

Still further alternative farming operations may be performed with a tractor in accordance with this invention, such as tractor 180 of FIGS. 15 and 16. In particular, such two figures illustrate utility of such an exemplary tractor 180 as a mobile irrigation system, by combining certain present implement interface means features with certain present rear lift means features, as represented by FIGS. 15 and 16.

For example, a bidirectional operator station 186 may be oriented for alignment in a reverse direction (arrow 264), during which operations may be performed for laying down an irrigation hose 266. Such hose may be supported about an irrigation hose drum 268 (a standard, known commercially available device) which is supported on an implement hitch means 270 in accordance with the present invention adapted for supporting such in an intermediate portion of the frame of tractor 180.

Similar to the embodiment of FIG. 8, such implement hitch means 270 may comprise a main framework member 272 supported on the underside of horizontal support surface 184 of tractor 180, a main support brace 274 connected thereto, and an interconnecting turnbuckle member 276, further interconnecting between members 274 and 272 so as to form a support triangle. A conventional three-point hitch means 278 is supported on the foregoing implement hitch means 270, and is further interconnected with members 280 and 282 for supporting such irrigation hose drum 268 with hose 266 initially wrapped thereon. Furthermore, lift means 244 is adapted for carrying an irrigation system, sprinkler system, or the like 284 on lift arms 248. One or more nozzles 286 are preferably downwardly directed, and the vertical height thereof above ground 288 may be adjusted through controlled operation of lift means 244. Alternatively, lengthy laterally-directed spray booms may replace nozzles 286 for wide coverage in a single pass. Hose 267 interconnects between nozzle 286 and hose 266 through a swivel connector or the like.

In the configuration of FIG. 15, an operator 290 is equipped to control the laying down of hose 266, for subsequent irrigation operations. For example, as shown in FIG. 16, tractor 180 may be thereafter driven in the direction of arrow 292 for spraying operations 294 relative ground crops 296. The appropriate vertical height of one or more nozzles 286 (or of an irrigation boom) may be selected by an operator. Otherwise, an optional automatic steering control means 298, such as a furrow-following wheel (shown in a stored location in FIG. 15) may be used for controlling irrigation or spraying operations. During such time, tractor 180 may follow furrows in which wheel 298 travels, while simultaneously picking up hose 266 by re-reeling same about drum 268, and while conducting spraying operations 294. Precise details of steering control means 298 are not required for a full and enabling disclosure of the present invention.

It is to be understood by those of ordinary skill in the art that the irrigation hose drum 268, hoses 266 and 267, and irrigation system 284, are all preferably removably received on the implement hitch means 270 and lift arms 248, respectively, wherefore multipurpose tractor 180 may alternatively be subsequently outfitted for performing other farming operations.

Additionally, it will be appreciated by those of ordinary skill in the art that various combinations of the above-discussed features may be provided as different exemplary embodiments of the present invention, including alternative configurations or constructions for those explicitly shown or suggested above. Accordingly, all of the foregoing exemplary embodiments and their related discussion are intended by way of example and description only and are not intended as limiting the present invention which is set forth more particularly in the appended claims.

What is claimed is:

1. A multipurpose tractor, comprising:
  a frame with wheel means and wheel-driving engine means supported thereon, said frame being adapted for attachment of differing farming implements thereto, and defining a support area thereon;
  an operator station supported on said frame at said support area thereof, and including supported therewith steering means for steering said wheel means, and further including supported therewith control means for operating said engine means and for controlling movement of said tractor; and
  support means, attached to said frame support area, for supporting said operator station and said means supported therewith such that said station and said means supported therewith are suspended from said frame support area and movable relative to said frame within a generally horizontal plane defined beneath said frame support area, for operator-selected positioning of said operator station and said means supported therewith relative said frame in said generally horizontal plane, whereby enhanced operator safety and performance is provided as such tractor is operated with differing implements attached thereto.

2. A multipurpose tractor as in claim 1, wherein said support means includes a pivot mounting secured to said frame, and having a generally vertical pivoting axis so that said operator station and said means included supported therewith may be rotated continuously about such axis into any desired position.

3. A multipurpose tractor as in claim 2, wherein:
said frame has a longitudinal axis and defines respective front and rear ends; and
said pivot mounting is supported at said front end of said frame, with said operator station generally suspended therebeneath.

4. A multipurpose tractor as in claim 2, further including power rotation means associated with said pivot mounting for controllably driving rotation of said operator station about said pivoting axis.

5. A multipurpose tractor as in claim 1, wherein said steering means comprises power steering means hydraulically connected for steering said wheel means thereof, and said control means comprises throttle controls connected with said wheel-driving engine means for controlling operating speed thereof.

6. A multipurpose tractor as in claim 1, wherein said support means includes boom means generally having respective first and second ends, with said first end being pivotably attached to said frame for selected positioning of said second end relative thereto, and wherein said operator station is supported on said boom means second end.

7. A multipurpose tractor as in claim 6, wherein said boom means first end is pivotable about a generally vertical axis.

8. A multipurpose tractor as in claim 6, further including power rotation means for controllably driving pivoting of said boom means first end.

9. A multipurpose tractor as in claim 6, further including a generally vertical support mast interconnecting said operator station with said boom means second end, said generally vertical support mast being rotatable relative said second end about a generally vertical axis, for further selection in orientation positioning of said operator station relative said frame.

10. A multipurpose tractor as in claim 9, wherein the vertical position of said operator station supported on said generally vertical support mast is adjustable, whereby the above-ground height of an operator seated in such operator station may be adjusted to accommodate varying conditions.

11. A multipurpose tractor as in claim 9, wherein said operator station is rotatable about a vertical axis laterally displaced from said generally vertical support mast, whereby through such rotation of said operator station and movement of said boom means, both the position and directional orientation of said operator station may be selected relative said frame.

12. A multipurpose tractor as in claim 1, wherein:
said frame defines a generally longitudinal axis with respective forward and rearward ends; and
said tractor further includes lift means supported on said frame rearward end and adapted for controllably lifting objects in a generally vertical plane.

13. A multipurpose tractor as in claim 12, wherein said lift means further include a pair of rearward projecting lift arms with adjustable horizontal spacing for use with different bulk handling devices and rear-carried implements and tools having respective paired lifting surfaces with differing horizontal spacings.

14. A multipurpose tractor as in claim 12, wherein:
said frame further has implement hitch means supported in an intermediate portion of said frame and adapted for removable support of an irrigation hose drum thereon; and
said lift means are adapted for receipt of an irrigation sprinkler system carried thereon and operatively associated with an irrigation hose associated with an irrigation hose drum carried on said frame;
wherein said tractor may be selectively used as a mobile irrigation system providing vertically adjustable nozzles for improved spray control, and thereafter outfitted with alternative implements for performance of other farming operations.

15. A multipurpose tractor as in claim 1, wherein said frame has a relatively high clearance substantially horizontal operational support surface and defines a generally open framework therebeneath.

16. A multipurpose tractor as in claim 15, further comprising implement interface means, supported on said operational support surface, and adapted for selected operative interface and association with different farming implements, whereby said multipurpose tractor may be alternatively outfitted with different implements for performing alternative farming operations while satisfying either low clearance or high clearance requirements.

17. A multipurpose tractor as in claim 16, wherein:
said frame defines a generally longitudinal axis with respective front and rear ends;
said operator station and said means supported therewith are supported rotatably together about a generally vertical axis on said frame; and
said implement interface means are supported on an underside of said operational support surface, and adapted for operative interface with farming implements generally in respective intermediate and rearward positions of said frame and at selected relatively high or relatively low clearance positions;
whereby alternative farming operations may be performed while satisfying low clearance or high clearance implement requirements, and with said operator station and said means supported therewith rotated into desired orientation relative said frame longitudinal axis for enhanced operator safety and performance.

18. A multipurpose tractor as in claim 16, wherein:
said frame defines a generally longitudinal axis with respective front and rear ends;
said tractor further includes boom means pivotably mounted at one end thereof about a generally vertical axis on a generally forward position of said support surface, for controlled movement of a free end of such boom means about said frame;
said operator station and said means supported therewith are supported on said boom means free end for controlled movement therewith; and
said implement interface means are supported on an underside of said operational support surface, and adapted for operative interface with farming implements generally in respective forward and rearward positions of said frame and at selected relatively high or relatively low clearance positions;
whereby alternative farming operations may be performed while satisfying low clearance or high clearance implement requirements, and with said operator station and said means supported therewith moved into a desired position relative said frame for enhanced operator safety and performance.

19. A multipurpose tractor, comprising:

a frame with wheel means and wheel-driving engine means supported thereon, said frame being adapted for attachment of differing farming implements thereto;

an operator station supported on said frame, and including therewith steering means for steering said wheel means, and control means for operating said engine means, for controlling movement of said tractor; and support means for supporting said operator station such that said station is movably mounted on said frame within a generally horizontal plane for operator-selected positioning of said operator station and means included therewith relative said frame, whereby enhanced operator safety and performance is provided as such tractor is operated with differing implements attached thereto;

hydrostatic transmission means drivingly interconnecting said engine means and said wheel means, and joystick electrical control means mounted on said operator station for movement therewith an actuable by an operator seated in such station for controlling the speed and direction of the tractor through controlling said hydrostatic transmission means interconnecting said engine means to said wheel means; and a portable control box for receiving said joystick electrical control means, said portable control box being removable from said operator station while still interconnected with said hydrostatic transmission means so that an operator standing off from said tractor may operate forward and reverse movement of said tractor, such as for hitching operations or the like; wherein said tractor includes implement interface means for receipt of three-point hitches with controllable hydraulic cylinders therein; and said portable control box includes means for controlling actuation of said hydraulic cylinders whereby an operator may remotely operate same.

20. A multipurpose tractor, comprising:

a main body frame having wheels and controllable motive power means for powering movement and operation of said tractor, said frame being adapted for operative attachment of differing farming implements thereto;

boom means generally having respective first and second ends, with said first end being pivotably attached to said frame for selected positioning of said second end relative thereto; and operator station means for controlling said tractor and adapted for receipt of an operator therein, said operator station means being supported on said boom means second end, whereby selected positioning of said boom means permits corresponding selected positioning of said operator station means relative said frame for enhanced operator safety and performance as such tractor is operated with different implements attached thereto.

21. A multipurpose tractor as in claim 20, wherein said operator station means includes steering means hydraulically connected for steering said wheels, and control means connected with said motive power means for controlling operating speed thereof.

22. A multipurpose tractor as in claim 20, further including hydrostatic transmission means drivingly interconnecting said motive power means and said wheels, and joystick electrical control means mounted on said operator station means for movement therewith and actuable by an operator seated in such station for controlling the speed and direction of the tractor through controlling said hydrostatic transmission means interconnecting said motive power means to said wheels.

23. A multipurpose tractor as in claim 22, further including a portable control box for receiving said joystick electrical control means, said portable control box being removable from said operator station means while still interconnected with said hydrostatic transmission means so that an operator standing off from said tractor may operate forward and reverse movement of said tractor, such as for hitching operations or the like.

24. A multipurpose tractor as in claim 23, wherein:
said tractor includes implement interface means for receipt of three-point hitches with controllable hydraulic cylinders therein; and
said portable control box includes means for controlling actuation of said hydraulic cylinders whereby an operator may remotely operate same.

25. A multipurpose tractor as in claim 20, wherein said boom means first end is pivotable about a generally vertical axis.

26. A multipurpose tractor as in claim 20, further including power rotating means for controllably driving pivoting of said boom means first end.

27. A multipurpose tractor as in claim 20, further including a generally vertical support mast interconnecting said operator station means with said boom means second end, said generally vertical support mast being rotatable relative said second end about a generally vertical axis, for further selection in orientation positioning of said operator station means relative said frame.

28. A multipurpose tractor as in claim 27, wherein the vertical position of said operator station means supported on said generally vertical support mast is adjustable, whereby the above-ground height of an operator seated in such operator station means may be adjusted to accommodate varying conditions.

29. A multipurpose tractor as in claim 27, wherein said operator station means are rotatable about a vertical axis laterally displaced from said generally vertical support mast, whereby through such rotation of said operator station means and movement of said boom means, both the position and directional orientation of said operator station means may be selected relative said frame.

30. A multipurpose tractor as in claim 20, wherein:
said frame defines generally longitudinal axis with respective forward and rearward ends;
said tractor further includes lift means supported on said frame rearward end and adapted for controllably lifting objects in a generally vertical plane; and
said lift means further include a pair of rearward projecting lift arms with adjustable horizontal spacing for use with different bulk handling devices and rear-carried implements and tools having respective paired lifting surfaces with differing horizontal spacings.

31. A multipurpose tractor as in claim 20, wherein:
said frame has a relatively high clearance substantially horizontal operational support surface and defines a generally open framework therebeneath; and
said tractor further comprises implement interface means, supported on said operational support surface, and adapted for selected operative interface and association with different farming implements, whereby said multipurpose tractor may be alternatively outfitted with different implements for performing alternative farming operations while satisfying either low clearance or high clearance requirements.

32. A multipurpose tractor as in claim 31, wherein:
said frame defines a generally longitudinal axis with respective front and rear ends;
said operator station means are supported on said boom means second end for controlled movement therewith; and
said implement interface means are supported on an underside of said operational support surface, and adapted for operative interface with farming implements generally in respective forward and rearward positions of said frame and at selected relatively high or relatively low clearance positions;
whereby alternative farming operations may be performed while satisfying low clearance or high clearance implement requirements, and with said operator station means moved into a desired position relative said frame for enhanced operator safety and performance.

33. A multipurpose farming tractor, including:
a main body frame having wheels and a controllable engine for driving same, said frame defining a generally longitudinal axis with respective forward and rearward ends;
lift means supported on said frame rearward end and adapted for controllably lifting objects in a generally vertical plane, and including a pair of rearward-projecting lift arms with adjustable horizontal spacing for use with different bulk handling devices and rear-carried implements and tools having respective paired lifting surfaces with differing horizontal spacings; and
bidirectional operator station means carried on said frame for full bidirectional operational control of said tractor, whereby an operator may alternatively select forward and rearward operator station means orientations relative said frame depending on the operations being conducted with said lift means.

34. A multipurpose farming tractor as in claim 33, further including:
boom means generally having respective first and second ends, with said first end being pivotably attached to said frame for selected positioning of said second end relative thereto; and
wherein said bidirectional operator station means are mounted on said boom means second end which in turn is pivotably supported relative said frame, whereby selected positioning of said boom means permits corresponding selected positioning of said bidirectional operator station means relative said frame for enhanced operator safety and performance, while simultaneously continuing to permit an operator to alternatively select between forward and rearward operator station means orientations relative such frame.

35. A multipurpose farming tractor as in claim 33, wherein:
said main body frame has a relatively high clearance substantially horizontal operational support surface and defines a generally open framework therebeneath; and
said tractor further includes implement interface means, supported on said operational support surface, and adapted for selected operative interface and association with different farming implements, whereby said multipurpose tractor may be alternatively outfitted with different implements for performing alternative farming operations while satisfying either low clearance or high clearance requirements.

36. A multipurpose farming tractor as in claim 33, wherein:
said main body frame has implement hitch means supported in an intermediate portion of said frame and adapted for removable support of an irrigation hose drum thereon; and
said lift means are adapted for receipt of an irrigation sprinkler system carried thereon and operatively associated with an irrigation hose associated with an irrigation hose drum carried on said frame; and
said tractor may be selectively used as a mobile irrigation system providing vertically adjustable nozzles for improved spray control, and thereafter outfitted with alternative implements for performance of other farming operations.

37. A multipurpose agricultural tractor adapted for use with different farming implements selectively associated therewith, comprising:
a main body frame having wheels and motive power means, and implement hitch means supported in an intermediate portion of said frame and adapted for removable support of an irrigation hose drum thereon; and
vertically adjustable lift means carried on said main frame and adapted for receipt of an irrigation sprinkler system carried thereon and operatively associated with an irrigation hose associated with an irrigation hose drum carried on said frame;
wherein said tractor may be selectively used as a mobile irrigation system providing vertically adjustable nozzles for improved spray control, and thereafter outfitted with alternative implements for performance of other farming operations.

38. A multipurpose agricultural tractor as in claim 37, further comprising:
steering means for steering said wheels, and control means for operating said motive power means for controlling movement of said tractor.

39. A multipurpose agricultural tractor as in claim 38, further including:
an operator station supported on said frame and including thereon said steering means and said control means; and
support means for supporting said operator station such that said station is movably mounted on said frame within a generally horizontal plane for operator-selected positioning of said operator station and means included thereon relative said frame, whereby enhanced operator safety and performance is provided.

40. A multipurpose agricultural tractor as in claim 39, wherein said support means includes a pivot mounting secured to said frame, and having a generally vertical pivoting axis so that said operator station and means included thereon may be rotated continuously about such axis into any desired position.

41. A multipurpose agricultural tractor as in claim 39, wherein said support means includes boom means generally having respective first and second ends, with said first end being pivotably attached to said frame for selected positioning of said second end relative thereto, and wherein said operator station is supported on said boom means second end.

42. A multipurpose agricultural tractor as in claim 37, further including an automatic steering device for said wheels, and having a furrow-following wheel for automated mobile irrigation without an on-board operator.

43. A multipurpose horticultural crop tractor, comprising:
a main body frame with a relatively high clearance substantially horizontal operational support surface and defining a generally open framework therebeneath;
wheel means and associated controllable motive power means, all mounted on said main body frame for controlled self-propulsion of same;
an operator station and associated control means supported on said main body frame for controlling propulsion thereof; and
implement interface means, supported on said operational support surface, and adapted for selected operative interface and association with different farming implements, whereby said multipurpose tractor may be alternatively outfitted with different implements for performing alternative farming operations while satisfying either low clearance or high clearance requirements.

44. A multipurpose horticultural crop tractor as in claim 43, wherein:
said frame defines a generally longitudinal axis with respective front and rear ends;
said operator station and associated control means are supported rotatably together about a generally vertical axis on said frame; and
said implement interface means are supported on an underside of said operational support surface, and adapted for operative interface with farming implements generally in respective intermediate and rearward positions of said frame and at selected relatively high or relatively low clearance positions;
whereby alternative farming operations may be performed while satisfying low clearance or high clearance implement requirements, and with said operator station and associated control means rotated into desired orientation relative said frame longitudinal axis for enhanced operator safety and performance.

45. A multipurpose horticultural crop tractor as in claim 43, wherein:
said frame defines a generally longitudinal axis with respective front and rear ends;
said tractor further includes boom means pivotably mounted at one end thereof about a generally vertical axis for controlled movement of a free end of such boom means thereof said frame;
said operator station and associated control means are supported on said boom means free end for controlled movement therewith; and
said implement interface means are supported on an underside of said operational support surface, and adapted for operative interface with farming implements generally in respective forward and rearward positions of said frame and at selected relatively high or relatively low clearance positions;
whereby alternative farming operations may be performed while satisfying low clearance or high clearance implement requirements, and with said operator station and associated control means moved into a desired position relative said frame for enhanced operator safety and performance.

46. A multipurpose horticultural crop tractor as in claim 43, wherein:
said frame defines a generally longitudinal axis with respective forward and rearward ends; and
said tractor further includes lift means supported on said frame rearward end and adapted for controllably lifting objects in a generally vertical plane.

47. A multipurpose horticultural crop tractor as in claim 46, wherein said lift means further include a pair of rearward-projecting lift arms with adjustable horizontal spacing for use with different bulk handling devices and rear-carried implements and tools having respective paired lifting surfaces with differing horizontal spacings.

48. A multipurpose horticultural crop tractor as in claim 46, wherein:
said implement interface means are supported generally in an intermediate portion of said main body frame and adapted for removable support of an irrigation hose drum thereon; and
said lift means are adapted for receipt of an irrigation sprinkler system carried thereon and operatively associated with an irrigation hose associated with an irrigation hose drum carried on said frame;
wherein said tractor may be selectively used as a mobile irrigation system providing vertically adjustable nozzles for improved spray control, and thereafter out-fitted with alternative implements for performance of other operations.

49. A multipurpose horticultural crop tractor as in claim 43, further including support means for supporting said operator station and associated control means such that said operator station and associated control means are movably mounted on said frame within a generally horizontal plane for operator-selected positioning of said operator station and associated control means relative said frame for enhanced operator safety and performance.

50. A multipurpose horticultural crop tractor as in claim 49, wherein said support means includes a pivot mounting secured to said frame, and having a generally vertical pivoting axis so that said operator station and associated control means may be rotated continuously about such axis into any desired position.

51. A multipurpose horticultural crop tractor as in claim 49, wherein said support means includes boom means generally having respective first and second ends, with said first end being pivotably attached to said frame for selected positioning of said second end relative thereto, and wherein said operator station is supported on said boom means second end.

52. A multipurpose horticultural crop tractor, comprising:
a main body frame with a relatively high clearance substantially horizontal operational support surface and defining a generally open framework therebeneath, and further defining a generally longitudinal axis with respective front and rear ends;
wheel means and associated controllable motive power means, all mounted on said main body frame for controlled self-propulsion of same;
an operator station and associated control means supported rotatably together about a generally vertical axis on said main body frame for controlling propulsion thereof; and implement interface means, supported on an underside of said relatively high clearance substantially horizontal operational support surface, and adapted for selected operative interface and association with different farming implements generally in respective intermediate and rearward positions of said frame and at selected relatively high or relatively low clearance positions;

whereby said multipurpose tractor may be alternatively outfitted with different implements for performing alternative farming operations while satisfying either low clearance or high clearance requirements, and with said operator station and associated control means rotated into a desired orientation relative said frame longitudinal axis for enhanced operator safety and performance as such tractor is moved in alternative directions performing differing farming operations.

53. A multipurpose horticultural crop tractor as in claim 52, further including lift means supported on said frame rear end and adapted for controllably lifting objects in a generally vertical plane.

54. A multipurpose horticultural crop tractor as in claim 52, wherein said operator station and associated control means are supported generally at the front end of said main body frame.

55. A multipurpose horticultural crop tractor as in claim 52, wherein said implement interface means are adapted for operative interface and association with a conventional three-point hitch arrangement.

56. A multipurpose horticultural crop tractor as in claim 52, further including a bracing member adapted for interconnecting between said implement interface means and said main body frame whenever said interface means is situated in said relatively high clearance position thereof.

57. A multipurpose horticultural crop tractor, comprising:

a main body frame with a relatively high clearance substantially horizontal operational support surface and defining a generally open framework therebeneath, and further defining a generally longitudinal axis with respective front and rear ends;

wheel means and associated controllable motive power means, all mounted on said main body frame for controlled self-propulsion of same;

boom means pivotably mounted at one end thereof about a generally vertical axis on a generally forward position of said support surface, for controlled movement of a free end of such boom means about said main body frame;

an operator station and associated control means supported on said boom means free end for controlled movement therewith, for controlling propulsion of said frame; and implement interface means, supported on an underside of said relatively high clearance substantially horizontal operational support surface, and adapted for selected operative interface and association with different farming implements generally in respective forward and rearward positions of said frame and at selected relatively high or relatively low clearance positions;

whereby said multipurpose tractor may be alternatively outfitted with different implements for performing alternative farming operations while satisfying either low clearance or high clearance requirements, and with said operator station and associated control means moved into a desired position relative said frame for enhanced operator safety and performance as such tractor performs differing farming operations with various implements associated therewith.

58. A multipurpose horticultural crop tractor as in claim 57, further including lift means supported on said frame rear end and adapted for controllably lifting objects in a generally vertical plane.

59. A multipurpose horticultural crop tractor as in claim 57, wherein said boom means is pivotable over an arc generally encompassing from about the front of said main body frame to an intermediate area thereof so that said operator station and associated control means may be correspondingly selectively positioned relative said main body frame.

60. A multipurpose horticultural crop tractor as in claim 57, wherein said implement interface means are adapted for operative interface and association with a conventional three-point hitch arrangement.

61. A multipurpose horticultural crop tractor as in claim 57, further including a bracing bar member interconnectable between said main body frame and said operator station for stabilizing same once said boom means is controllably moved to a desired position.

62. A multipurpose horticultural crop tractor as in claim 57, wherein said operator station and associated control means are pivotably mounted on said boom means free end so as to be fully movable in a bidirectional sense relative thereto, whereby both the desired position and directional orientation of said operator station and associated control means relative said frame may be selected.

* * * * *